(12) United States Patent
Tabata et al.

(10) Patent No.: US 12,227,817 B2
(45) Date of Patent: Feb. 18, 2025

(54) STEEL

(71) Applicant: NIPPON STEEL CORPORATION, Tokyo (JP)

(72) Inventors: Shinichiro Tabata, Tokyo (JP); Kazuhisa Kusumi, Tokyo (JP); Yuki Suzuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/036,253

(22) PCT Filed: Jan. 19, 2022

(86) PCT No.: PCT/JP2022/001710
§ 371 (c)(1),
(2) Date: May 10, 2023

(87) PCT Pub. No.: WO2022/158469
PCT Pub. Date: Jul. 28, 2022

(65) Prior Publication Data
US 2023/0407428 A1   Dec. 21, 2023

(30) Foreign Application Priority Data

Jan. 19, 2021   (JP) .................................. 2021-006369

(51) Int. Cl.
*B32B 15/01*   (2006.01)
*C21D 1/18*   (2006.01)
(Continued)

(52) U.S. Cl.
CPC .............. *C21D 9/46* (2013.01); *B32B 15/013* (2013.01); *C21D 1/18* (2013.01); *C21D 6/002* (2013.01);
(Continued)

(58) Field of Classification Search
CPC ..... C22C 38/001; C22C 38/008; C22C 38/20; C22C 38/26; C22C 38/32; B32B 15/013
(Continued)

(56) References Cited

U.S. PATENT DOCUMENTS

2017/0081741 A1   3/2017   Tabata et al.
2017/0081742 A1   3/2017   Tabata et al.

FOREIGN PATENT DOCUMENTS

EP   3 922 738 A1   12/2021
JP   2002-102980 A   4/2002
(Continued)

OTHER PUBLICATIONS

Lim, KR20190088191A Google Patents machine translation printed on Jul. 25, 2024, Jul. 26, 2019, entire translation (Year: 2019).*

*Primary Examiner* — Katherine A Christy
(74) *Attorney, Agent, or Firm* — Birch, Stewart, Kolasch & Birch, LLP (57) ABSTRACT

This steel has a steel sheet substrate and a protective film formed on at least a part of a surface of the steel sheet substrate, the chemical composition of the steel sheet substrate is, by mass %, C: 0.25% to 0.65%, Si: 0.05% to 2.00%, Mn: 0.30% to 3.00%, P: 0.050% or less, S: 0.0100% or less, N: 0.010% or less, O: 0.010% or less, Cr: 0.05% to 1.00%, and Cu: 0.10% to 1.00%, in an X-ray analysis in which measurement is carried out using a CuKα radiation, in a case where a peak intensity at a diffraction angle (2θ) position of 36.6±0.5° is regarded as 100%, the protective film has a peak having a peak intensity of more than 250% at a diffraction angle (2θ) position of 35.5±0.5° and a tensile strength is more than 1,500 MPa.

5 Claims, 1 Drawing Sheet (51) Int. Cl.
| | |
|---|---|
| *C21D 6/00* | (2006.01) |
| *C21D 8/02* | (2006.01) |
| *C21D 9/46* | (2006.01) |
| *C22C 33/04* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/34* | (2006.01) |
| *C22C 38/38* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/60* | (2006.01) |
| *C23C 2/06* | (2006.01) |
| *C23C 2/12* | (2006.01) |
| *C23C 2/40* | (2006.01) |

(52) U.S. Cl.
CPC ............. *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 33/04* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/60* (2013.01); *C23C 2/06* (2013.01); *C23C 2/12* (2013.01); *C23C 2/40* (2013.01); C21D 2211/008 (2013.01); C21D 2261/00 (2013.01)

(58) Field of Classification Search
USPC ........................................................ 428/639
See application file for complete search history.

(56) References Cited

FOREIGN PATENT DOCUMENTS

| | | | |
|---|---|---|---|
| JP | 4712838 B2 | | 6/2011 |
| JP | 2012-1802 A | | 1/2012 |
| JP | 2012-180594 A | | 9/2012 |
| JP | 2013-237101 A | | 11/2013 |
| KR | 20190088191 A | * | 7/2019 |
| WO | WO 2015/182591 A1 | | 12/2015 |
| WO | WO 2015/182596 A1 | | 12/2015 |
| WO | WO 2020/162513 A1 | | 8/2020 |

* cited by examiner

STEEL

TECHNICAL FIELD OF THE INVENTION

The present invention relates to a steel.

Priority is claimed on Japanese Patent Application No. 2021-006369, filed in Japan on Jan. 19, 2021, the content of which is incorporated herein by reference.

RELATED ART

In the field of a steel sheet for a vehicle, in order to improve both fuel consumption and collision safety against the background of recent stringent environmental regulations and collision safety standards, the application of a steel sheet having high tensile strength (high strength steel sheet) has expanded. However, the press formability of the steel sheet decreases with high-strengthening, thereby making it difficult to manufacture the steel sheet into a product having a complex shape.

Specifically, the ductility of the steel sheet decreases with high-strengthening, and the steel sheet is fractured at a highly processed portion when the steel sheet is processed into a complex shape, which is a problem. Furthermore, with the high-strengthening of the steel sheet, the residual stress after processing causes springback and wall warpage, and the dimensional accuracy deteriorates, which is a problem. Therefore, it is not easy to press-form a steel sheet having high strength, particularly a tensile strength of 780 MPa or more, into a product having a complex shape. Roll forming makes it easier to process a high strength steel sheet than press forming, but is limited to being applied to components each having a uniform cross section in a longitudinal direction.

Therefore, in recent years, for example, as disclosed in Patent Documents 1 to 3, a hot stamping technique has been adopted as a technique of press-forming a material that is difficult to form, for example, a high strength steel sheet. The hot stamping technique is a hot forming technique of heating a material provided for forming and then of forming the material.

In this technique, the material is heated and then formed. Therefore, during forming, the steel material is soft and has good formability. Accordingly, even a steel sheet having high strength can be accurately formed into a complex shape. Furthermore, in the hot stamping technique, since quenching is performed simultaneously with forming by a press die, a steel (steel member) after forming has sufficient strength.

For example, Patent Document 1 discloses that the hot stamping technique makes it possible to impart a tensile strength of 1,400 MPa or more to a steel member after forming.

In recent years, countries around the world have set higher $CO_2$ reduction targets, and each vehicle manufacturer has progressed in reducing fuel consumption in consideration of collision safety. Not only gasoline vehicles but also electric vehicles that are under rapid progress require, as its materials, high-strength materials that protect not only passengers but also batteries from collision and that cancel out the amount of an increase in weight. For example, in a steel member that is in use for vehicles and the like, a steel that has a higher strength than Patent Document 1 or a strength that is commonly used as a steel member formed by hot stamping at present (strength of more than 1.5 GPa) is required.

However, most of metal materials deteriorate in various properties with high-strengthening and particularly, the hydrogen embrittlement susceptibility increases. It is known that the hydrogen embrittlement susceptibility increases when the tensile strength of a steel member is 1.2 GPa or more, and there is a case of hydrogen embrittlement cracking in bolt steel for which high-strengthening has been progressed ahead of the vehicle field. Therefore, in the hot stamping member having a tensile strength of more than 1.5 GPa, an additional increase in the hydrogen embrittlement susceptibility is concerned.

In steel members that are in use for vehicles, there is a risk that hydrogen embrittlement cracking may be caused due to hydrogen that is generated from the corrosion of a steel while vehicles are in operation. As described above, since the hydrogen embrittlement susceptibility of a steel extremely increases particularly in a strength range of more than 1.5 GPa, it is considered that the steel may hydrogen-embrittle due to a small amount of hydrogen generated by slight corrosion. However, vehicle design that completely prevents corrosion of a steel is difficult. Therefore, in order to apply the hot stamped member having a strength of more than 1.5 GPa to the vehicle body for a further reduction in the weight of the vehicle body, a risk of hydrogen embrittlement cracking needs to be sufficiently reduced.

Regarding a high-strength steel having a tensile strength of more than 1.5 GPa, for example, Patent Document 2 discloses a press-formed article that has excellent toughness and a tensile strength of 1.8 GPa or more and that is hot press-formed. Patent Document 3 discloses a steel having an extremely high tensile strength of 2.0 GPa or more and, furthermore, having good toughness and ductility. Patent Document 4 discloses a steel having a high tensile strength of 1.8 GPa or more and, furthermore, having good toughness. Patent Document 5 discloses a steel having an extremely high tensile strength of 2.0 GPa or more and, furthermore, having good toughness.

However, these steels have not been sufficiently studied from the viewpoint of hydrogen embrittlement resistance in a corrosive environment, and further improvement in hydrogen embrittlement resistance is desired.

For example, Patent Document 6 discloses a high-strength cold-rolled steel sheet having excellent hydrogen embrittlement resistance and workability, in which the steel sheet has a structure in which 50% or more (including 100%) of tempered martensite is contained in terms of area ratio and a remainder is ferrite and as a distribution state of precipitates in the tempered martensite, 20 or more precipitates having a circle equivalent diameter of 1 to 10 nm are present per 1 $\mu m^2$ in the tempered martensite and 10 or less precipitates containing V and having a circle equivalent diameter of 20 nm or more are present per 1 $\mu m^2$ in the tempered martensite. In Patent Document 6, attention is paid to a high strength steel sheet having a tempered martensite single phase or a two-phase structure made of ferrite and tempered martensite, and it is disclosed that stretch flangeability can be improved while securing hydrogen embrittlement resistance by adding V as an alloying element to the high strength steel sheet to make the sizes of carbide and carbonitride of V, which strongly act as hydrogen trap sites, appropriate and introducing the carbide and carbonitride into martensite.

However, Patent Document 6 relates to a high strength cold-rolled steel sheet of 980 MPa or more in a state of a steel sheet before hot stamping. This high strength cold-rolled steel sheet is not a steel sheet for hot stamping, and, in Patent Document 6, not only mechanical properties such as strength after hot stamping in the case of hot stamping the steel sheet but also hydrogen embrittlement resistance and the like are not studied.

PRIOR ART DOCUMENT

Patent Document

[Patent Document 1] Japanese Unexamined Patent Application. First Publication No. 2002-102980
[Patent Document 2] Japanese Unexamined Patent Application. First Publication No. 2012-180594
[Patent Document 3] Japanese Unexamined Patent Application, First Publication No. 2012-1802
[Patent Document 4] PCT International Publication No. WO2015/182596
[Patent Document 5] PCT International Publication No. WO2015/182591
[Patent Document 6] Japanese Patent No. 4712838

DISCLOSURE OF THE INVENTION

Problems to be Solved by the Invention

The present invention has been made to solve the above problems, and an object of the present invention is to provide a steel having a high tensile strength and excellent hydrogen embrittlement resistance in a corrosive environment.

Means for Solving the Problem

The gist of the present invention is the following steel.

(1) A steel according to one aspect of the present invention having a steel sheet substrate and a protective film formed on at least a part of a surface of the steel sheet substrate, in which a chemical composition of the steel sheet substrate is, by mass %, C: 0.25% to 0.65%, Si: 0.05% to 2.00%, Mn: 0.30% to 3.00%. P: 0.050% or less, S: 0.0100% or less, N: 0.010% or less, O: 0.010% or less, Cr: 0.05% to 1.00%, Cu: 0.10% to 1.00%, Ti: 0% to 0.10%, B: 0% to 0.0100%, Mo: 0% to 1.00%, Ni: 0% to 1.00%, Nb: 0% to 0.10%, V: 0% to 1.00%, Ca: 0% to 0.010%, Mg: 0% to 0.010%, Al: 0% to 1.00%, Sn: 0% to 1.00%, W: 0% to 1.00%, Sb: 0% to 1.00%, Zr: 0% to 1.00%, Co: 0% to 1.00%, REM: 0% to 0.30%, and a remainder: Fe and an impurity, in an X-ray analysis in which measurement is carried out using a CuKα radiation, in a case where a peak intensity at a diffraction angle (2θ) position of 36.6±0.5° is regarded as 100%, the protective film has a peak having a peak intensity of more than 250% at a diffraction angle (2θ) position of 35.5±0.5° and a tensile strength is more than 1,500 MPa.

[2] In the steel according to [1], the protective film may be formed on the entire surface of the steel sheet substrate.

[3] In the steel according to [1], a corrosion-resistant coat may be formed on a portion of the surface of the steel sheet substrate, on which the protective film is not formed.

[4] In the steel according to [3], a corrosion-resistant coat may be formed on each of two surfaces of the steel sheet substrate perpendicular to a sheet thickness direction, and the protective film may be formed on each of two surfaces of the steel sheet substrate parallel to the sheet thickness direction.

[5] In the steel according to [3] or [4], the corrosion-resistant coat may be an Al—Fe-based coat or a Zn—Fe-based coat.

[6] In the steel according to any one of [1] to [5], a ratio of a maximum Cu content in the protective film to a Cu content in the steel sheet substrate may be 1.5 or more.

Effects of the Invention

According to the above-described aspect of the present invention, it is possible to provide a steel having a high tensile strength and excellent hydrogen embrittlement resistance in a corrosive environment.

EMBODIMENTS OF THE INVENTION

In order to obtain a steel having a high tensile strength and excellent hydrogen embrittlement resistance in a corrosive environment, the present inventors investigated the influences of a corrosive structure or a steel that serves as a material on these properties. As a result, the following findings were obtained.

Most of commonly used steel sheets showing a tensile strength of about 1.5 GPa (1,500 MPa) after a heat treatment including quenching such as hot stamping contain about 0.20 mass % of C, and a strength after the heat treatment is secured due to this C.

(a) In order to achieve a further reduction in the weight of the vehicle body, the present inventors conducted a detailed study for obtaining a steel having a high strength of more than 1.5 GPa after a heat treatment by means of an increase in the C content. As a result, it was found that, in terms of tensile strength, an ultrahigh strength of more than 1.5 GPa could be obtained after a heat treatment including quenching such as hot stamping by setting the C content to 0.25 mass % or more. On the other hand, there was a concern about a risk that hydrogen embrittlement susceptibility increased with ultrahigh-strengthening to a tensile strength of more than 1.5 GPa and hydrogen embrittlement cracking was caused by hydrogen generated in a corrosive environment while vehicles were in operation.

(b) The present inventors found that hydrogen embrittlement in a corrosive environment can be suppressed by forming a protective film having excellent corrosion resistance on the surface of a steel sheet substrate in a high-strength steel having a tensile strength of more than 1.5 GPa.

Based on the above-described findings, the present inventors developed a steel having a significantly improved hydrogen embrittlement resistance in a corrosive environment and a tensile strength of more than 1.5 GPa. Such a steel has a high strength and a low risk of hydrogen embrittlement and thus can be applied to vehicle bodies more safely.

Hereinafter, each requirement of a steel according to an embodiment of the present invention (steel according to the present embodiment) will be described in detail.

(A) Steel

Figure 1:
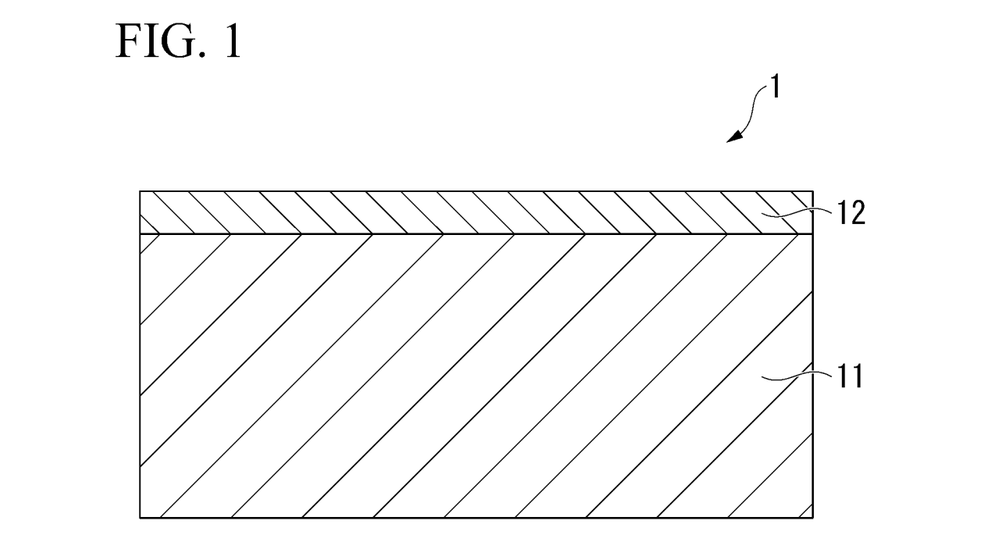
FIG. 1 is a schematic view showing an example of a steel according to the present embodiment.

As shown in FIG. 1, a steel 1 according to the present embodiment has a steel sheet substrate 11 including a predetermined chemical composition and a protective film 12 formed on the surface of the steel sheet substrate 11 and having excellent corrosion resistance.

In addition, the protective film 12 of the steel 1 according to the present embodiment contains a large amount of $Fe_3O_4$, and, in X-ray analysis in which measurement is carried out using a CuKα radiation (X-ray diffraction method), in a case where a peak intensity at a diffraction angle (2θ) position of 36.6±0.5° is regarded as 100%, the protective film has a peak having a peak intensity of more than 250% at a diffraction angle (2θ) position of 35.5±0.5°. Here, in FIG. 1, the protective film 12 is formed only on one surface of the steel sheet substrate 11, but may be formed on all surfaces.

In addition, a part of the surfaces of the steel sheet substrate 11 may be covered with a corrosion-resistant coat 13 (the corrosion-resistant coat 13 is formed on a part of the surfaces), and the other surfaces may be covered with the protective films 12 (the protective films 12 are formed on the other surfaces). In other words, a part of the surfaces of the steel sheet substrate 11 may be covered with the protective film 12, and portions not covered with the protective film 12 may be covered with the corrosion-resistant coats 13.

Figure 2:
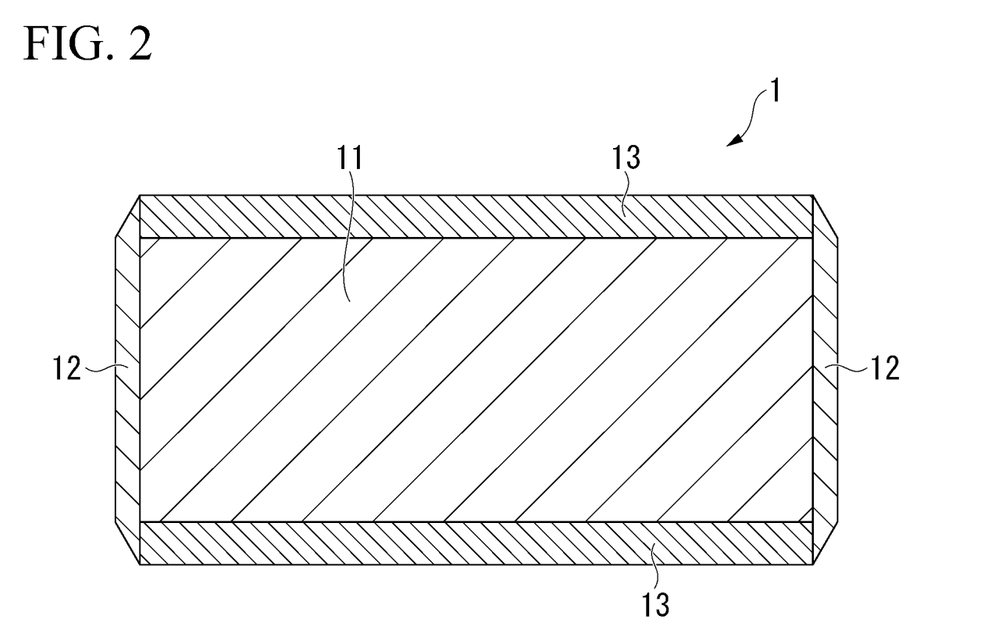
FIG. 2 is a schematic view showing another example of the steel according to the present embodiment.

For example, as shown in FIG. 2, the corrosion-resistant coats 13 may be formed on two surfaces of the steel sheet substrate 11 perpendicular to the sheet thickness direction, and the protective films 12 may be formed on two surfaces of the steel sheet substrate 11 parallel to the sheet thickness direction (for example, the cut end surfaces of the steel sheet substrate 11).

The steel 1 according to the present embodiment is formed by hot stamping in many cases, and the steel 1 can also be referred to as a hot stamped formed body or a hot stamped member.

Hereinafter, each will be described below.

(A1) Steel Sheet Substrate

The steel sheet substrate 11 included in the steel 1 according to the present embodiment has a predetermined chemical composition. Specifically, the chemical composition of the steel sheet substrate 11 is, by mass %, C: 0.25% to 0.65%, Si: 0.05% to 2.00%, Mn: 0.30% to 3.00%, P: 0.050% or less, S: 0.0100% or less, N: 0.010% or less, O: 0.010% or less, Cr: 0.05% to 1.00%, Cu: 0.10% to 1.00%, Ti: 0% to 0.10%, B: 0% to 0.0100%, Mo: 0% to 1.00%, Ni: 0% to 1.00%, Nb: 0% to 0.10%, V: 0% to 1.00%, Ca: 0% to 0.010%, Mg: 0% to 0.010%, Al: 0% to 1.00%, Sn: 0% to 1.00%, W: 0% to 1.00%, Sb: 0% to 1.00%, Zr: 0% to 1.00%, Co: 0% to 1.00%, REM: 0% to 0.30%, and a remainder: Fe and an impurity.

The reasons for limiting each element are as described below. Here, the chemical composition of the steel sheet substrate 11 refers to the chemical composition of a portion excluding the protective film 12 on the surface (or the corrosion-resistant coat 13 in a case where the protective film 12 is absent and the corrosion-resistant coat 13 is formed) (for example, a ¼ position of the thickness from the surface of the steel sheet substrate 11). Hereinafter, % regarding the content is mass % unless otherwise specified.

C: 0.25% to 0.65%

C is an element that enhances the hardenability of steel and improves the strength of the steel that is obtained after quenching such as hot stamping. When the C content is less than 0.25%, it becomes difficult to secure sufficient strength (more than 1.5 GPa) in the steel after quenching (after hot stamping). Therefore, the C content is set to 0.25% or more. The C content is preferably set to 0.28% or more, 0.31% or more, or 0.33% or more.

On the other hand, when the C content is more than 0.65%, the strength of the steel after quenching becomes excessively high, and deterioration of the hydrogen embrittlement resistance becomes significant. Therefore, the C content is set to 0.65% or less. The C content is preferably set to 0.60% or less, 0.55% or less, 0.50% or less, 0.45% or less, or 0.40% or less.

Si: 0.05% to 2.00%

Si is an element that is effective in enhancing the hardenability of steel and in stably securing the strength of the steel after quenching. In addition, Si is an effective element for making a scale into a tight scale having good adhesion during a heat treatment to be described below. Such a tight scale can be used as a base material for protective films having excellent corrosion resistance. In order to obtain this effect, the Si content needs to be set to 0.05% or more. The Si content is preferably set to 0.10% or more and more preferably set to 0.15% or more, 0.25% or more or 0.35% or more.

On the other hand, when the Si content in steel is more than 2.00%, a heating temperature required for austenitic transformation becomes significantly high during the heat treatment (quenching). Accordingly, the cost required for the heat treatment may increase, or ferrite may remain during heating and thereby the strength of the steel decreases. Therefore, the Si content is set to 2.00% or less. The Si content is preferably set to 1.50% or less, 1.20% or less, 0.80% or less or 0.60% or less.

Mn: 0.30% to 3.00%

Mn is an element that is very effective in enhancing the hardenability of steel and in stably securing the strength after quenching. Furthermore, Mn is an element that lowers an Ac3 point and promotes the lowering of the quenching treatment temperature. However, when the Mn content is less than 0.30%, the effect is not sufficient. Therefore, the Mn content is set to 0.30% or more. The Mn content is preferably set to 0.40% or more, 0.50% or more, 0.60% or more, 0.70% or more or 0.80% or more.

On the other hand, when the Mn content is more than 3.00%, the hydrogen embrittlement resistance of the steel after quenching deteriorates. Therefore, the Mn content is set to 3.00% or less. In addition, the Mn content is preferably set to 2.50% or less and more preferably set to 1.50% or less, 1.20% or less, 1.00% or less, 0.90% or less or 0.80% or less.

P: 0.050% or Less

P is an element that degrades the hydrogen embrittlement resistance of the steel after quenching. In particular, when the P content is more than 0.050%, deterioration of the hydrogen embrittlement resistance becomes significant. Therefore, the P content is limited to 0.050% or less. The P content may be limited to 0.020% or less, 0.010% or less or 0.006% or less.

Since it is preferable that the P content is small, the P content may be 0%. However, the P content may be set to 0.001% or more from the viewpoint of cost.

S: 0.0100% or Less

S is an element that degrades the hydrogen embrittlement resistance of the steel after quenching. In particular, when the S content is more than 0.0100%, deterioration of the hydrogen embrittlement resistance becomes significant. Therefore, the S content is limited to 0.0100% or less. The S content is preferably limited to 0.0050% or less. The S content may be limited to 0.0020% or less, 0.0010% or less or 0.0006% or less. Since it is preferable that the S content is small, the S content may be 0%. However, the S content may be set to 0.0001% or more from the viewpoint of cost.

N: 0.010% or Less

N is an element that degrades the hydrogen embrittlement resistance of the steel after quenching. In particular, when the N content is more than 0.010%, coarse nitrides are formed in steel, and the hydrogen embrittlement resistance significantly deteriorates. Therefore, the N content is set to 0.010% or less. The N content may be limited to 0.008% or less, 0.006% or less or 0.004% or less. A lower limit of the N content does not have to be particularly limited and may be 0%. However, setting the N content to less than 0.0002% leads to an increase in steelmaking cost and is economically undesirable. Therefore, the N content may be set to 0.0002% or more, 0.0008% or more or 0.001% or more.

O: 0.010% or Less

O is an element that degrades the hydrogen embrittlement resistance of the steel after quenching. In particular, when the O content is more than 0.010%, coarse nitrides are formed in steel, and the hydrogen embrittlement resistance significantly deteriorates. Therefore, the O content is set to 0.010% or less. The O content may be limited to 0.008% or less, 0.006% or less or 0.004% or less. A lower limit of the O content does not have to be particularly limited and may be 0%. However, setting the O content to less than 0.0002% leads to an increase in steelmaking cost and is economically undesirable. Therefore, the O content may be set to 0.0002% or more, 0.0008% or more or 0.001% or more.

Cr: 0.05% to 1.00%

Cr is an element that is effective in enhancing the hardenability of steel and in stably securing the strength of the steel after quenching. In addition, Cr is an effective element for making a scale into a tight scale having good adhesion, which can be used as a base material for protective films having excellent corrosion resistance, during the heat treatment to be described below. In order to obtain this effect, the Cr content needs to be set to 0.05% or more. The Cr content is preferably set to 0.10% or more.

On the other hand, when the Cr content is more than 1.00%, the above effects are saturated and the cost increases. Furthermore, since Cr has an action of stabilizing iron carbides, when the Cr content is more than 1.00%, coarse iron carbides may remain undissolved during the heat treatment of the steel sheet, and the hydrogen embrittlement resistance of the steel may deteriorate. Therefore, the Cr content is set to 1.00% or less. In order to reduce the alloy cost, the Cr content is preferably set to 0.80% or less, 0.60% or less, 0.50% or less or 0.40% or less.

Cu: 0.10% to 1.00%

Cu is an element that is effective in enhancing the hardenability of steel and in stably securing the strength of the steel after quenching. In order to obtain this effect, 0.10% or more of Cu needs to be contained. In addition, Cu is an element that further improves the corrosion resistance by stabilizing a protective film to be described below. In order to obtain this effect, the Cu content is preferably set to 0.18% or more and more preferably set to 0.20% or more. The reason for the protective film being stabilized by the containing of Cu is not clear, but it is considered that, in the initial phase of protective film formation, Cu concentrates on the surface of the steel sheet substrate, and the protective film is uniformly and densely grown, whereby a stable protective film in which Cu is partially concentrated is formed.

On the other hand, when the Cu content is more than 1.00%, the above effects are saturated and the cost increases. Therefore, the Cu content is set to 1.00% or less. In order to reduce the alloy cost, the Cu content is preferably set to 0.80% or less, 0.60% or less, 0.50% or less or 0.30% or less.

In order to improve various properties (hardenability, strength, hydrogen embrittlement resistance, a deoxidation property, corrosion resistance and the like) of the steel and components containing the steel, one or more elements selected from the group consisting of Ti, B, Mo, Ni, Nb, V, Ca, Mg, Al, Sn, W, Sb, Zr, Co and REM may be further contained in ranges to be described below. These elements are optional elements and do not necessarily have to be contained. Therefore, the lower limit thereof is 0%.

Ti: 0% to 0.100%

Ti is an element having an action of refining austenite grains by suppressing recrystallization and by suppressing grain growth by means of the formation of fine carbides when the steel sheet is subjected to a heat treatment in which the steel sheet is heated to a temperature of the Ac3 point or higher. Therefore, an effect of increasing the hydrogen embrittlement resistance of the steel can be obtained by containing Ti. Furthermore, Ti is an element that is preferentially bonded to N in the steel to suppress the consumption of B caused by the precipitation of BN and to promote an effect of enhancing the hardenability induced by B to be described below. Therefore, Ti may be contained. In order to obtain the above effect, the Ti content is preferably set to 0.010% or more and more preferably set to 0.015% or more.

On the other hand, when the Ti content is more than 0.100%, the amount of precipitation of TiC increases and C is consumed, so that the strength of the steel after quenching decreases. Therefore, in the case of containing Ti, the Ti content is set to 0.100% or less. In order to reduce the alloy cost, the Ti content is preferably set to 0.080% or less, 0.060% or less or 0.030% or less.

B: 0% to 0.0100%

B is an element having an action of dramatically enhancing the hardenability of steel even with a small amount. Furthermore, B is an element that is segregated at grain boundaries to strengthen the grain boundaries and to improve the hydrogen embrittlement resistance, and that suppresses the growth of austenite grains when the steel sheet is heated. Therefore, B may be contained. In order to obtain the above effect, the B content is preferably set to 0.0005% or more and more preferably set to 0.0010% or more.

On the other hand, when the B content is more than 0.0100%, a large amount of coarse compounds are precipitated, and the hydrogen embrittlement resistance of the steel deteriorates. Therefore, in the case of containing B, the B content is set to 0.0100% or less. In order to reduce the alloy cost, the B content is preferably set to 0.0080% or less, 0.0050% or less or 0.0025% or less.

Mo: 0% to 1.00%

Mo is an element that is very effective in enhancing the hardenability of steel and in stably securing the strength of the steel after quenching. In particular, a synergistic effect of improving the hardenability can be obtained by containing a compound of Mo and B. Therefore, Mo may be contained. In order to obtain the above effect, the Mo content is preferably set to 0.10% or more and more preferably set to 0.20% or more.

On the other hand, Mo is an element having an action of stabilizing iron carbides. When the Mo content is more than 1.00%, coarse iron carbides may remain undissolved when the steel sheet is heated, and the hydrogen embrittlement resistance of the steel after quenching may deteriorate. In addition, the cost increase is significant. Therefore, in the case of containing Mo, the Mo content is set to 1.00% or less. In order to reduce the alloy cost, the Mo content is preferably set to 0.80% or less, 0.60% or less or 0.32% or less.

Ni: 0% to 1.00%

Ni is an element that is effective in enhancing the hardenability of steel and in stably securing the strength of the steel after quenching. Therefore, Ni may be contained. In order to obtain the above effect, the Ni content is preferably set to 0.10% or more and more preferably set to 0.20% or more.

On the other hand, when the Ni content is more than 1.00%, the limit hydrogen amount of the steel decreases. In addition, the cost increase is significant. Therefore, in the case of containing Ni, the Ni content is set to 1.00% or less. In order to reduce the alloy cost, the Ni content is preferably set to 0.50% or less, more preferably set to 0.25% or less, and still more preferably set to 0.20% or less.

Nb: 0% to 0.10%

Nb is an element having an action of forming fine carbides in steel and of improving the hydrogen embrittlement resistance of steel by means of the grain refining effect by the carbides. Therefore. Nb may be contained. In order to obtain the above effect, the Nb content is preferably set to 0.02% or more and more preferably set to 0.03% or more.

On the other hand, when the Nb content is more than 0.10%, the carbides become coarse and the hydrogen embrittlement resistance of the steel deteriorates. Therefore, in the case of containing Nb, the Nb content is set to 0.10% or less. In order to reduce the alloy cost, the Nb content is preferably set to 0.08% or less, 0.06% or less or 0.04% or less.

V: 0% to 1.00%

V is an element that forms fine carbides in steel and improves the hydrogen embrittlement resistance of the steel by means of the refining effect or hydrogen trapping effect by the carbides. Therefore, V may be contained. In order to obtain the above effects, the V content is preferably set to 0.01% or more and more preferably set to 0.10% or more.

However, when the V content exceeds 1.00%, the above-described effects are saturated, and the economic efficiency decreases. Therefore, in the case of containing V, the V content is set to 1.00% or less. In order to reduce the alloy cost, the V content is preferably set to 0.50% or less, 0.30% or less or 0.20% or less.

Ca: 0% to 0.010%

Ca is an element having an effect of refining inclusions in steel and of enhancing the hydrogen embrittlement resistance of the steel after quenching. Therefore, Ca may be contained. In order to obtain the above effect, the Ca content is preferably set to 0.001% or more and more preferably set to 0.002% or more.

On the other hand, when the Ca content is more than 0.010%, the effect is saturated and the cost increases. Therefore, in the case of containing Ca, the Ca content is set to 0.010% or less. The Ca content is preferably set to 0.005% or less and more preferably set to 0.004% or less or 0.003% or less.

Mg: 0% to 0.010%

Mg is an element having an effect of refining inclusions in steel and improving toughness after a heat treatment. Therefore, Mg may be contained. In the case of obtaining the above effect, the Mg content is preferably set to 0.001% or more. The Mg content is more preferably 0.002% or more.

On the other hand, when the Mg content is more than 0.010%, the effect is saturated and the cost increases. Therefore, in the case of containing Mg, the Mg content is set to 0.010% or less. The Mg content is preferably 0.005% or less and more preferably 0.004% or less.

Al: 0% to 1.00%

Al is an element commonly used as a steel deoxidizing agent. Therefore, Al may be contained. In order to obtain the above effect, the Al content is preferably set to 0.01% or more.

On the other hand, when the Al content is more than 1.00%, the above effect is saturated and the economic efficiency decreases. Therefore, in the case of containing Al, the Al content is set to 1.00% or less. In order to reduce the alloy cost, the Al content is preferably set to 0.50% or less, 0.30% or less, 0.10% or less, 0.06% or less or 0.04% or less.

Sn: 0% to 1.00%

Sn is an element that stabilizes the protective film and improves the corrosion resistance in a corrosive environment. Therefore, Sn is preferably contained. When the Sn content is less than 0.01%, since these effects are not sufficient, in the case of containing Sn, the Sn content is preferably set to 0.01% or more. The Sn content is more preferably set to 0.03% or more and still more preferably set to 0.05% or more.

However, when the Sn content is more than 1.00%, the grain boundary strength decreases, and the hydrogen embrittlement resistance of the steel after quenching deteriorates. Therefore, in the case of containing Sn, the Sn content is set to 1.00% or less. In order to reduce the alloy cost, the Sn content is preferably set to 0.50% or less, 0.30% or less, 0.10% or less, 0.06% or less or 0.04% or less.

W: 0% to 1.00%

W is an element that is effective in enhancing the hardenability of steel and in stably securing the strength of the steel after quenching. Therefore, W may be contained. Furthermore, W is an element that improves the corrosion resistance in a corrosive environment. In order to obtain the above effects, the W content is preferably set to 0.01% or more.

On the other hand, when the W content is more than 1.00%, the above effects are saturated and the economic efficiency decreases. Therefore, in the case of containing W, the W content is set to 1.00% or less. In order to reduce the alloy cost, the W content is preferably set to 0.50% or less, 0.30% or less, 0.10% or less, 0.06% or less or 0.04% or less.

Sb: 0% to 1.00%

Sb is an element that improves the corrosion resistance in a corrosive environment. Therefore. Sb may be contained. In order to obtain the above effect, the Sb content is preferably set to 0.01% or more.

On the other hand, when the Sb content is more than 1.00%, the grain boundary strength decreases, and the hydrogen embrittlement resistance of the steel after quenching deteriorates. Therefore, in the case of containing Sb, the Sb content is set to 1.00% or less. In order to reduce the alloy cost, the Sb content is preferably set to 0.50% or less, 0.30% or less, 0.10% or less, 0.06% or less or 0.04% or less.

Zr: 0% to 1.00%

Zr is an element that improves the corrosion resistance in a corrosive environment. Therefore, Zr may be contained. In order to obtain the above effect, the Zr content is preferably set to 0.01% or more.

On the other hand, when the Zr content is more than 1.00%, the grain boundary strength decreases, and the hydrogen embrittlement resistance of the steel after quenching deteriorates. Therefore, in the case of containing Zr, the Zr content is set to 1.00% or less. In order to reduce the alloy cost, the Zr content is preferably set to 0.50% or less, 0.30% or less, 0.10% or less, 0.06% or less or 0.04% or less.

Co: 0% to 1.00%

Co is an element that improves the corrosion resistance in a corrosive environment. Therefore. Co may be contained. In order to obtain the above effect, the Co content is preferably set to 0.01% or more.

On the other hand, when the Co content is more than 1.00%, the above effects are saturated and the economic efficiency decreases. Therefore, in the case of containing Co, the Co content is set to 1.00% or less. In order to reduce the alloy cost, the Co content is preferably set to 0.50% or less, 0.30% or less, 0.10% or less, 0.06% or less or 0.04% or less.

REM: 0% to 0.30%

Similar to Ca, REM is an element having an effect of refining inclusions in steel and of improving the hydrogen embrittlement resistance of the steel after quenching. Therefore, REM may be contained. In order to obtain the above effects, the REM content is preferably set to 0.01% or more and more preferably set to 0.02% or more.

On the other hand, when the REM content is more than 0.30%, the effect is saturated and the cost increases. Therefore, in the case of containing REM, the REM content is set to 0.30% or less. The REM content is preferably set to 0.20% or less, 0.10% or less or 0.04% or less.

Here, REM refers to a total of 17 elements including Sc, Y, and lanthanoids such as La and Nd, and the REM content means the total content of these elements. REM is added to molten steel using, for example, a Fe—Si-REM alloy, and this alloy contains, for example, La, Nd, Ce, and Pr.

In the chemical composition of the steel sheet substrate 11 included in the steel 1 according to the present embodiment, elements other than the above elements, that is, the remainder is Fe and an impurity.

Here, the "impurity" is a component that is mixed because of various factors including raw materials such as ore and scrap and a manufacturing step when the steel sheet is industrially manufactured, and are acceptable in a range without adversely affecting the properties of the steel according to the present embodiment.

The chemical composition of the steel sheet substrate 11 can be obtained by the following method.

The chemical composition can be obtained by performing elemental analysis using a general method such as ICP-AES from a ¼ position of the sheet thickness (position at (¼) of the thickness) from the surface in the sheet thickness direction of the steel sheet substrate 11. C and S may be measured using an infrared absorption method after combustion, N may be measured using an inert gas melting-thermal conductivity method, and O may be measured using an inert gas melting-nondispersive infrared absorption method.

Internal Structure of Steel Sheet Substrate

The internal structure (metallographic structure) of the steel sheet substrate 11 included in the steel 1 according to the present embodiment is not limited, but is a structure primarily containing martensite having high strength in the case of obtaining a tensile strength of more than 1.5 GPa. Preferably, martensite is 70% or more in terms of area fraction. More preferably, martensite is 80% or more or 90% or more. Martensite may be 100%. When the area fraction of martensite is small, it becomes difficult to obtain a tensile strength of more than 1.5 GPa.

The internal structure of the steel sheet substrate 11 may contain residual austenite, bainite, ferrite, and/or pearlite as the remainder other than martensite.

For example, the total area fraction of martensite and bainite may be 90% or more. The total area fraction of martensite and bainite is preferably 92% or more, 95% or more or 98% or more. The total area fraction of martensite and bainite may be set to 100%. Martensite includes, in addition to so-called fresh martensite, tempered martensite and auto-tempered martensite. The auto-tempered martensite is tempered martensite formed during cooling at the time of quenching without a heat treatment for tempering, and is formed by in-situ tempering of martensite formed due to self-heating associated with martensitic transformation.

The microstructural fractions in the internal structure of the steel sheet substrate 11 can be measured by the following method.

The area fraction of martensite (also including tempered martensite and auto-tempered martensite) is measured by a transmission electron microscope (TEM) and an electron beam diffractometer attached to the TEM.

A measurement sample is cut out from a position 10 mm or more away from the end portion of the steel sheet substrate (the center portion in a case where the width or length of the steel sheet substrate are less than 20 mm) and the position at (¼) of the thickness of the steel sheet substrate) and used as a thin film sample for TEM observation. In this thin film sample, a range of 400 µm$^2$ is observed by TEM.

By using the electron beam diffraction pattern of the thin film sample, martensite or bainite, which has body-centered cubic lattices, and residual austenite, which has face-centered cubic lattices are distinguished. Then, iron carbides ($Fe_3C$) in martensite and bainite are found by the diffraction pattern, and the precipitation morphology thereof is observed to measure the microstructural fraction of each of martensite and bainite. Specifically, regarding the precipitation morphology, precipitation in three directions is determined to be martensite, and precipitation limited to one direction is determined to be bainite.

The microstructural fractions of martensite and bainite measured by the TEM are measured in area %; however, since the metallographic structure of the steel according to the present embodiment has isotropy, the values of the area fractions can be directly replaced into volume fractions. Carbides are observed to distinguish between martensite and bainite; however, in the present embodiment, carbides are not a measurement subject of the microstructural fraction.

Ferrite or pearlite that may be present as the remainder in microstructure can be easily confirmed with an optical microscope or a scanning electron microscope. Specifically, a measurement sample including the position 10 mm or more away from the end portion of the steel sheet substrate (the center portion in a case where the width and length of the steel sheet substrate are less than 20 mm) and the position at (¼) of the thickness of the steel sheet substrate) is cut out and used as a sample for observation. The cut sample is mechanically polished and then mirror-finished. Next, etching is performed on the sample with a nital etching solution to reveal ferrite and pearlite, and a range of 40000 µm$^2$ in terms of area is observed using a scanning electron microscope, thereby confirming the presence of ferrite or pearlite. A structure in which ferrite and cementite are alternately arranged in layers is distinguished to be pearlite, and a structure in which cementite is precipitated in particles is distinguished to be bainite.

Coat of Steel Sheet Substrate

A coat (corrosion-resistant coat) 13 may be provided on a part of the surface of the steel sheet substrate 11 included in the steel 1 according to the present embodiment. The coat (corrosion-resistant coat) 13 may be a coat mainly containing Al and Fe (Al—Fe-based coat) or a coat mainly containing Zn and Fe (Zn—Fe-based coat). The coat is also referred to as a membrane, an alloyed plating layer or an intermetallic compound layer. In a state before being subjected to a heat treatment (C1) to be described below, which corresponds to a heat treatment of hot stamping (for example, a state of a steel sheet before hot stamping), the steel sheet is a plated steel sheet mainly having a "plating layer" such as Al-based plating or Zn-based plating. The plating layer in the state of the steel sheet before hot stamping does not necessarily need to be an alloyed plating layer and may be an (unalloyed) plating layer. However, in the steel 1 after being subjected to the heat treatment (C1) to be described below (for example, a hot stamped formed body), even when the plating has not been an alloyed plating in the state of the steel sheet, the plating is alloyed by the subsequent heat treatment (C1), and the plating layer (that is, the coat) becomes an alloyed plating layer. The alloyed plating layer may also be simply a plating layer, and the coat of the steel 1 may also be simply referred to as a plating layer.

The coat mainly containing Al and Fe in the steel 1 is a coat in which the average chemical composition of the entire coat contains 70 mass % or more of Fe and Al in total. The average chemical composition may further contain, in addition to Al and Fe, Si, Mg, Ca, Sr, Ni, Cu, Mo, Mn, Cr, C, Nb, Ti, B, V, Sn, W, Sb, Zn, Co, In, Bi, Zr, Se, As and REM, and the remainder may be an impurity.

The coat mainly containing Zn and Fe in the steel 1 is a coat in which the average chemical composition of the entire coat contains 70 mass % or more of Fe and Zn in total. The average chemical composition may further contain, in addition to Zn and Fe, Si, Mg, Ca, Sr, Ni, Cu, Mo, Mn, Cr, C, Nb, Ti, B, V, Sn, W, Sb, Al, Co, In, Bi, Zr, Se, As and REM, and the remainder may be an impurity.

(A2) Protective Film

The steel 1 according to the present embodiment has the protective film 12 on at least a part of the surface of the steel sheet substrate 11 described above. The protective film 12 contains a large amount of $Fe_3O_4$, and, in X-ray analysis in which measurement is carried out using a CuKα radiation (X-ray diffraction method), in a case where a peak intensity at a diffraction angle (2θ) position of 36.6±0.5° is regarded as 100%, the protective film has a peak having a peak intensity of more than 250% at a diffraction angle (2θ) position of 35.5±0.5°. When this protective film 12 is formed on the surface of the steel sheet substrate 11, the corrosion resistance of the steel 1 improves.

Here, a substance having a diffraction angle (2θ) corresponding to near 35.5° is $Fe_3O_4$ (magnetite), a substance having a diffraction angle (2θ) corresponding to near 36.6° is FeOOH (iron oxyhydroxide (III)), and 35.5° and 36.6° are the main peak position of the each substance. That is, it means that in the protective film 12 included in the steel 1 according to the present embodiment, the volume fraction of $Fe_3O_4$ is large relative to FeOOH. (±0.5° is a tolerance in consideration of a measurement error or the like.)

Since $Fe_3O_4$ has a high density relative to FeOOH, it is considered that an increase in the proportion of $Fe_3O_4$ having a high density makes the protective film 12 dense and suppresses the generation of hydrogen in a corrosive environment and thereby the hydrogen embrittlement resistance improves.

In the X-ray analysis of the protective film 12 that is measured using a CuKα radiation as described above, when the peak intensity at a diffraction angle (2θ) position of 36.6±0.5° is regarded as 100%, in a case where the peak intensity at a diffraction angle (2θ) position of 35.5±0.5° is 250% or less, the volume fraction of $Fe_3O_4$ of the protective film 12 is small, and a sufficient effect of improving the corrosion resistance by the protective film 12 cannot be obtained.

In the steel 1 according to the present embodiment, the protective film 12 is a film mainly containing an iron oxide or iron oxyhydroxide and desirably contains a total of 70 mass % or more of Fe, O, and H. The protective film 12 may further contain, in addition to Fe, O and H, Si, Mg, Ca, Sr, Ni, Cu, Mo, Mn, Cr, C, Nb, Ti, B, V, Sn, W, Sb, Zr, REM, and Zn, which are the above-described components of the steel sheet substrate 11.

In a case where the steel 1 according to the present embodiment includes the corrosion-resistant coat 13, the above-described protective film 12 having excellent corrosion resistance refers to the protective film that is formed on a surface at a position where the corrosion-resistant coat 13 is not present among the surfaces of the steel sheet substrate 11. That is, in such a case, the steel sheet substrate 11 has a portion including the corrosion-resistant coat 13 on the surface and a portion including the protective film 12 on the surface. For example, in the case of the steel 1 obtained by cutting a steel sheet having the corrosion-resistant coat 13, the corrosion-resistant coat 13 is not present on the cut end surface. Therefore, it is possible to produce the steel 1 in which the protective films 12 are formed on the surfaces of the cut end surface and the corrosion-resistant coats 13 are formed on the other surfaces (for example, refer to FIG. 2).

In a case where the steel 1 does not include the corrosion-resistant coat 13, the protective films 12 may be formed on the entire surface of the steel sheet substrate 11.

The thickness of the protective film 12 is not particularly limited, but is preferably 5 μm or more in order to obtain a sufficient effect of improving the corrosion resistance. On the other hand, when the thickness of the protective film 12 is more than 300 μm, it becomes difficult to sufficiently secure the strength as a steel. Therefore, the thickness of the protective film 12 is preferably 300 μm or less.

In the steel according to the present embodiment, it is preferable that Cu is concentrated in the protective film. Specifically, the ratio of the maximum Cu content in the protective film to the Cu content in the steel sheet substrate (the maximum Cu content in the protective film/the Cu content in the steel sheet substrate: Cu concentration ratio) is preferably 1.5 or more, 1.7 or more, 1.9 or more or 2.1 or more.

The protective film in which Cu is concentrated is uniform, dense, and stable and thus contributes to further improvement in corrosion resistance. When the ratio of the maximum Cu content in the protective film to the Cu content of the steel sheet substrate is less than 1.5, a sufficient effect cannot be obtained.

The upper limit of the ratio of the maximum Cu content in the protective film to the Cu content in the steel sheet substrate does not need to be particularly set, but may be set to 5.0. The upper limit of the above ratio may be set to 4.5, 4.0, 3.5, 3.0, or 2.8 as necessary.

The intensities of the peak at a diffraction angle position of 35.5±0.5° and the peak at a diffraction angle position of 36.6±0.5° in the protective film 12 are obtained using X-ray diffraction (XRD). At the time of measurement, the measurement is performed using an automated multipurpose X-ray diffractometer (SmartLab 3 kW manufactured by Rigaku Corporation) and a CuKα radiation at time intervals set to 2°/min. diffraction angles (2θ) up to 90° are obtained, and the intensities of the peak at a diffraction angle position of 35.5±0.5° and the peak at a diffraction angle position of 36.6±0.5° are obtained. At the time of obtaining the peak intensities, a SmartLab Studio II manufactured by Rigaku Corporation is used as software, the diffraction profile is fitted using a pseudo-Voigt function, and the peak count is regarded as the peak intensity. In addition, B-spline interpolation is performed as background, and a peak intensity from which the value thereof has been subtracted is used.

From this result, the proportions of the peak intensity at the diffraction angle (2θ) position of 36.6 & 0.5° and the peak intensity at the diffraction angle (2θ) position of 35.5±0.5° can be calculated.

Other peaks attributed to the presence of $Fe_3O_4$ or FeOOH that are obtained from the protective film 12 may be present at diffraction angles (2θ) of near 11°, 14°, 16°, 21°, 26°, 27°, 30°, 31°, 33°, 34°, 39°, 41°, 43°, 50°, 53°, 55°, 57°, 58°, 61°, 62°, 63°, 71°, 75° and 83°. However, almost all these peaks have a small intensity compared with peaks near 35.5° and 36.6°. Therefore, it is not necessary to measure the peak intensities at angles other than near 35.5° and 36.6°.

The maximum Cu content in the protective film is obtained by performing GDS (glow discharge spectrometry) on the protective film 12.

Specifically, GDS (glow discharge spectrometry) is performed in the thickness direction from the surface of the protective film, and the maximum Cu content in a range from the surface of the protective film up to the interface between the protective film and the steel sheet substrate is obtained. This measurement is performed five times, and the average value of the maximum Cu contents obtained in individual measurements is regarded as the maximum Cu content in the protective film. At the time of measurement, since an impurity may be attached onto the protective film, the Fe content and the O content are also measured, and a position where the total content of Fe and O becomes 85% is regarded as the surface of the protective film. In addition, a position where the Fe content becomes 95% is regarded as the interface between the protective film and the steel sheet substrate.

(A3) Characteristics of Steel

In the steel 1 according to the present embodiment, when the protective film 12 is controlled as described above, corrosion is reduced, and hydrogen intrusion due to corrosion is suppressed. Therefore, the steel 1 according to the present embodiment is excellent in terms of hydrogen embrittlement resistance in a corrosive environment. In addition, in the steel 1 according to the present embodiment, the tensile strength is a high strength of more than 1,500 MPa (1.5 GPa). The tensile strength of the steel 1 according to the present embodiment is preferably 1800 MPa or more.

The upper limit of the tensile strength is not limited, but an increase in the tensile strength degrades formability or workability, and thus the tensile strength may be set to 3200 MPa or less, 3000 MPa or less or 2800 MPa or less.

In a case where the steel is a tailored property material having different strengths depending on points as described below, at least a part of the steel needs to have a tensile strength of more than 1,500 MPa.

In the present embodiment, the hydrogen embrittlement resistance in a corrosive environment is evaluated by an exposure test in an environment where the steel is actually used or a corrosion promotion test by CCT (composite cycle test). For example, the steel is exposed to the outdoor in a state of being bent at four points and thereby imparted with stress, and the hydrogen embrittlement resistance is evaluated based on whether the steel is cracked or not cracked for a certain period of time.

The shape of the steel 1 according to the present embodiment is not particularly limited. That is, the steel is a steel sheet member that is obtained by a heat treatment (including the case of being processed during heat treatment cooling) on the steel sheet that serves as a material of the steel 1, but the shape may be a flat sheet or may be a formed body (or a hot stamped formed body). Hot-formed steels are often formed bodies. However, in the present embodiment, both a formed body and a flat sheet will be referred to as "steel". Furthermore, the steel may be a tailored property material having different strengths depending on points. In this case, it is preferable that at least a part of the steel has a tensile strength of 1.5 GPa or more. Obtaining a region having different strengths makes it possible to control the deformation of a portion having a tensile strength of more than 1,500 MPa at the time of collision and makes it possible to protect occupants more safely.

(B) Steel Sheet Serving as Material

Next, a steel sheet that serves as a material of the steel sheet substrate 11 included in the steel 1 according to the present embodiment (hereinafter, may be referred to as a steel sheet according to the present embodiment) will be described. The steel sheet substrate 11 can be obtained by performing a heat treatment to be described below on a steel sheet to be described below.

Chemical Composition of Steel Sheet

The range of a chemical composition of the steel sheet according to the present embodiment is the same as the chemical composition of the steel sheet substrate 11 of the steel 1 according to the present embodiment, and the reason for its limitation is also the same.

For example, the chemical composition of the steel sheet is obtained by taking a ¼ position of the sheet thickness in the sheet thickness direction from the surface of the steel sheet as a representative position, and by performing elemental analysis at the position using a general method such as ICP.

Internal Structure of Steel Sheet

The internal structure (metallographic structure) of the steel sheet according to the present embodiment is not limited, but is ferrite or pearlite in many cases. In conditions of a manufacturing method to be described below, bainite, martensite, and residual austenite may be contained. The martensite includes tempered martensite and auto-tempered martensite. The auto-tempered martensite is tempered martensite formed during cooling at the time of quenching without a heat treatment for tempering, and is formed by in-situ tempering of martensite formed due to heat generated in association with martensitic transformation. The internal structure of the steel sheet is a structure of the steel sheet excluding the above boundary portion.

The internal structure of the steel sheet can be determined by the same method as that of the internal structure of the steel sheet substrate 11 described above.

Next, a method for manufacturing the steel 1 according to the present embodiment will be described.

(C) Method for Manufacturing Steel

The steel 1 according to the present embodiment can be manufactured by a manufacturing method including the following steps.

(C1) A heat treatment step of performing a heat treatment on a steel sheet having a predetermined chemical composition to produce the steel sheet substrate 11, and (C2) a protective film stabilizing treatment step of forming the protective film 12 on the steel sheet substrate 11 and stabilizing the protective film 12.

Hereinafter, each step will be described.

(C1) <Heat Treatment Step>

In the heat treatment step, a heat treatment is performed on a steel sheet having a predetermined chemical composition to produce the steel sheet substrate 11. The heat treatment is performed, for example, under conditions where the steel sheet obtained by a method to be described below is heated to the Ac3 point to (Ac3 point+300°) C at an average temperature rising rate of 1.0 to 1,000° C./s and is cooled to an Ms point (° C.) or lower at an average cooling rate of an upper critical cooling rate or faster.

When the temperature rising rate is slower than 1.0° C./s, the productivity of the heat treatment decreases, which is not preferable. On the other hand, when the temperature rising rate is faster than 1,000° C./s, a duplex grain structure is formed and the limit hydrogen amount decreases, which is not preferable.

Furthermore, when the heat treatment temperature is lower than the Ac3 point (° C.), ferrite remains after cooling and the strength is insufficient, which is not preferable. On the other hand, when the heat treatment temperature is higher than the Ac3 point+300° C., the structure becomes coarse and the limit hydrogen amount decreases, which is not preferable.

The upper critical cooling rate is a minimum cooling rate at which austenite is supercooled to form martensite without causing precipitation of ferrite or pearlite in the structure, and when cooling is performed at slower than the upper critical cooling rate, ferrite or pearlite is formed, and the strength is insufficient.

During heating, retention may be performed in a range of the heating temperature±10° C. for 1 to 300 seconds.

Furthermore, after the steel sheet is cooled to a temperature of the Ms point or lower, a tempering treatment may be performed in a temperature range of about 100° C. to 600° C. in order to adjust the strength of the steel.

The Ac3 point, the Ms point, and the upper critical cooling rate are measured by the following method.

Strip-shaped test pieces each having a width of 30 mm and a length of 200 mm are cut out from the steel sheet according to the present embodiment, and the test pieces are heated to 1,000° C. at a temperature rising rate of 10° C./s in a nitrogen atmosphere, held at the temperature for five minutes, and then cooled to room temperature at various cooling rates. The cooling rates are set at intervals of 10° C./s from 1° C./s to 100° C./s (here, 1° C./s is followed by 10° C./s). By measuring changes in the thermal expansion of each of the test pieces during heating and cooling at that time, the Ac3 point and the Ms point are measured.

Furthermore, among the test pieces cooled at the above cooling rates, the minimum cooling rate at which ferrite is not precipitated is defined as the upper critical cooling rate. Furthermore, the Ms point obtained from the change in thermal expansion in the case of cooling the steel sheet at the upper critical cooling rate or higher is regarded as the Ms point of the steel.

Here, in the series of heat treatments, hot forming such as hot stamping may be performed at the same time as while cooling to the Ms point is performed after heating in a temperature range of the Ac3 point to (Ac3 point+300°) C, that is, a cooling step is performed at the upper critical cooling rate or faster. Exemplary examples of the hot forming are bending, drawing, stretching, hole expanding, flange forming, and the like. Furthermore, the present invention may be applied to a forming method such as roll forming other than press forming as long as a device that cools the steel sheet simultaneously with or immediately after forming is provided. In a case where the thermal history described above is followed, hot forming may be repeatedly performed.

As described above, the steel according to the present embodiment includes both a steel sheet that is hot-formed to be a formed body and a steel sheet that is subjected to only the heat treatment to be a flat sheet.

Furthermore, as the steel according to the present embodiment, hot forming or a heat treatment may be performed on a part of the steel sheet that serves as a material to obtain a steel having regions having different strengths.

The series of heat treatments can be performed by any method, and, for example, heating may be performed by high frequency heating, energization heating, infrared heating, or furnace heating. Furthermore, cooling may be performed by water cooling, die cooling, or the like.

(C2) <Protective Film Stabilizing Treatment Step>

In the protective film stabilizing treatment step, the protective film 12 is formed on the surface of the steel sheet substrate 11 on which the corrosion-resistant coat 13 is not formed using a corrosion acceleration test, and the formed protective film 12 is stabilized. An iron oxide that serves as the base of the protective film 12 is formed on the steel sheet substrate 11 obtained in the above-described heat treatment step, and the protective film 12 can be formed and stabilized by a composite cycle of salt spraying, wetting, and drying. Specifically, in the composite cycle, the salt concentration (the concentration of a salt water) is set to 1 to 10%, the wet ratio ((the salt spraying time+the wetting time)/the total time) is set to 30% to 70%, one cycle is set to 8 hours, and the number of cycles is set to 30 to 100, whereby the protective film 12 containing a large amount of $Fe_3O_4$ can be formed and stabilized.

Hereinafter, each condition will be described.

Salt Concentration: 1 to 10%

In the protective film stabilizing treatment, the protective film 12 is formed by a reaction between the surface of the steel sheet substrate 11 and a chloride in the salt water to be sprayed. In order to stabilize the protective film 12, the salt concentration is preferably 1% to 10%. When the salt concentration is less than 1%, the protective film may be formed non-uniformly, which is not preferable. On the other hand, when the salt concentration is more than 10%, the corrosion rate is fast, and the protective film 12 may not be stably formed, which is not preferable.

Wet Rate: 30% to 70%

In the protective film stabilizing treatment, the protective film 12 is formed by the surface reaction with the chloride. In order to stabilize the protective film 12, the wet ratio is preferably 30% to 70%. When the wet ratio is less than 30%, the corrosion rate is fast, and the protective film 12 may not be stably formed, which is not preferable. On the other hand, when the wet ratio is more than 70%, the protective film 12 may be formed non-uniformly, which is not preferable.

Number of Cycles: 30 or More and 100 Cycles or Less (8 Hours Per Cycle)

In the protective film stabilizing treatment, the protective film 12 is formed by repeating a cycle of salt spraying, wetting, and drying. In a case where the number of these cycles is less than 30 cycles, the protective film 12 may not be sufficiently formed, which is not preferable. From the viewpoint of the formation of the protective film 12, it is not necessary to specify the upper limit of the cycle; however, when the number of cycles becomes excessive, the protective film may exfoliate, and a predetermined protective film may not be formed, which is not preferable. In addition, there is a concern that the thickness of the steel 1 may be reduced and the strength as a structure may decrease. Therefore, the number of cycles is set to 100 or less.

In addition, it is preferable that stress is not imparted to the steel sheet before the formation of the protective film. In a state where stress has been imparted, since the protective film formation behavior varies between a stress-imparted portion and the other portions, the protective film may not be stabilized even when the above-described protective film stabilizing treatment is performed, which is not preferable.

In addition, the protective film stabilizing treatment is preferably performed at 100° C. or lower.

When the temperature is high, the oxidation of the steel sheet is prioritized, and thus the ratio of the maximum Cu content in the protective film to the Cu content in the steel sheet substrate becomes less than 1.5.

(D) Method for Manufacturing Steel Sheet

Although a method for manufacturing a steel sheet suitable as a material for the steel sheet substrate 11 included in the steel 1 according to the present embodiment is not limited, the steel sheet can be manufactured using, for example, a manufacturing method including the following steps.

(i) A slab preparation step of melting and casting a steel having the above chemical composition, to manufacture a slab, (ii) a hot rolling step of hot-rolling the obtained slab into a hot-rolled steel sheet, (iii) a coiling step of coiling the hot-rolled steel sheet, (iv) a hot-rolled sheet annealing step of annealing the hot-rolled steel sheet after the coiling step as necessary, (v) a cold rolling step of descaling the hot-rolled steel sheet after the coiling step or after the hot-rolled sheet annealing step and of cold-rolling the hot-rolled steel sheet into a cold-rolled steel sheet, as necessary (vi) an annealing step of annealing the hot-rolled steel sheet or the cold-rolled steel sheet into an annealed steel sheet as necessary, and (vii) a coating step of applying a corrosion-resistant coat to the hot-rolled steel sheet, the cold-rolled steel sheet, or the annealed steel sheet to obtain a coated steel sheet as necessary.

Hereinafter, each step will be described.

<Slab Preparation Step>

In the slab preparation step, a steel having the above chemical composition is melted and casted to manufacture a slab provided for hot rolling. For example, it is possible to use a slab manufactured by a continuous casting method after molten steel having the above chemical composition is melted using a converter, an electric furnace, or the like. Instead of the continuous casting method, an ingot-making method, a thin slab casting method, or the like may be adopted.

<Hot Rolling Step>

In the hot rolling step, the slab is heated, subjected to rough rolling, then subjected to descaling as necessary, and finally subjected to finish rolling. Hot rolling conditions are not limited.

<Coiling Step>

In the coiling step, for example, the hot-rolled steel sheet after the hot rolling step is coiled in a temperature range of 800° C. or lower. When the coiling temperature is higher than 800° C., since the hot-rolled steel sheet is coiled in a state where transformation have hardly progressed yet, transformation progresses in the coil, and the coil shape may become defective, which is not preferable.

<Hot-Rolled Sheet Annealing Step>

In the annealing step of the hot-rolled steel sheet, for example, annealing is performed at 450° C. to 800° C. for five hours or longer in an atmosphere containing 80 vol % or more of nitrogen or in the atmosphere as necessary. Hot-rolled sheet annealing softens the hot-rolled steel sheet and makes it possible to reduce the load in the cold rolling step, which is the next step, which is preferable.

<Cold Rolling Step>

In the cold rolling step, the hot-rolled steel sheet after the hot-rolled sheet annealing step (in a case where the hot-rolled sheet annealing step is not performed, the hot-rolled steel sheet after the coiling step) is subjected to descaling and is cold-rolled into a cold-rolled steel sheet as necessary. Descaling and cold rolling do not need to be performed at all times. However, in a case where cold rolling is performed, the cumulative rolling reduction in the cold rolling is preferably set to 30% or larger from the viewpoint of securing good flatness. On the other hand, in order to prevent the rolling force from becoming excessive, the cumulative rolling reduction in the cold rolling is preferably set to 80% or smaller.

The descaling method is not particularly limited, but pickling is preferable. Furthermore, in a case where pickling is performed, it is preferable that only iron scales are removed by hydrochloric acid or sulfuric acid pickling.

<Annealing Step>

In the annealing step before coating, the hot-rolled steel sheet or the cold-rolled steel sheet is annealing in a temperature range of 700° C. to 950° C. as necessary to produce an annealed steel sheet. The annealing step softens the cold-rolled steel sheet and facilitates threading in a plating step, which is the next step, which is preferable.

<Coating Step>

In the coating step, a coat (corrosion-resistant coat that contributes to improvement in corrosion resistance) is formed on the surface of the steel sheet (the hot-rolled steel sheet after the coiling step, the hot-rolled steel sheet after the hot-rolled sheet annealing step, the cold-rolled steel sheet after the cold rolling step, or the annealed steel sheet after the annealing step) as necessary to obtain a coated steel sheet. A method for forming the corrosion-resistant coat is not particularly limited, and a hot-dip plating method, an electro plating method, a vacuum vapor deposition method, a cladding method, a thermal spraying method, and the like can be used. The hot-dip plating method is the most popular in the industry.

Examples of the coat that contributes to improvement in corrosion resistance include an Al-based coat containing Al, a Zn-based coat containing Zn and the like.

In the Al-based coat, a part or all of Al is alloyed with Fe in the steel sheet by the heat treatment to form an Al—Fe-based coat. Furthermore, in the Zn-based coat, a part or all of Zn is alloyed with Fe in the steel sheet by the heat treatment to form a Zn—Fe-based coat.

In a case where the Al-based coat is formed by hot-dip plating, in addition to Al, Fe is mixed in the plating bath as an impurity in many cases. Furthermore, in addition to the above elements, Si, Mg, Ca, Sr, Ni, Cu, Mo, Mn, Cr, C, Nb, TI, B, V, Sn, W, Sb, Zn, Co, In, Bi, Zr, Se, As, mischmetal, and the like may be contained in the plating bath as long as 70 mass % or more of Al is contained.

In the case of performing hot-dip plating, after the annealed steel sheet after the annealing step is cooled to room temperature, the temperature may be raised again and then plating may be performed, or the annealed steel sheet after the annealing step may be cooled to 650° C. to 750° C., which is close to the plating bath temperature, after annealing and then hot-dip plating may be performed without cooling the annealed steel sheet to room temperature once.

In a case where the Zn-based coat is formed by hot-dip plating, in addition to Zn, Fe is mixed in the plating bath as an impurity in many cases. Furthermore, in addition to the above elements, Si, Mg, Ca, Sr, Ni, Cu, Mo, Mn, Cr, C, Nb, Ti, B, V, Sn, W, Sb, Al, Co, In, Bi, Zr, Se, As, mischmetal, and the like may be contained in the plating bath as long as 70 mass % or more of Zn is contained.

In the case of performing hot-dip plating, after the annealed steel sheet after the annealing step is cooled to room temperature, the temperature may be raised again and then plating may be performed, or the annealed steel sheet after the annealing step may be cooled to 400° C. to 600° C., which is close to the plating bath temperature, after annealing and then hot-dip plating may be performed without cooling the annealed steel sheet to room temperature once.

Pretreatments and post-treatments of the corrosion-resistant coat are not particularly limited, and precoating, solvent coating, an alloying treatment, temper rolling, or the like can be performed. As the alloying treatment, for example, it is possible to anneal the Al-based coat at 450° C. to 800° C. Furthermore, as a post treatment, temper rolling is useful for shape adjustment and the like, and for example, rolling reduction of 0.1% to 0.5% is possible.

EXAMPLES

Hereinafter, the present invention will be described more specifically with examples, but the present invention is not limited to these examples.

Steels having a chemical composition shown in Table 1-1 and Table 1-2 (subsequent to Table 1-1) were melted to obtain slabs.

The obtained slabs were hot-rolled and coiled at a temperature of 800° C. or lower to obtain hot-rolled steel sheets each having a thickness of 3.2 mm.

Pickling and then cold rolling were performed on the hot-rolled steel sheets excluding B35 to B37 to obtain cold-rolled steel sheets each having a thickness of 1.6 mm.

On some of the steel sheets (B38 to 40), hot-rolled sheet annealing was performed before pickling. The hot-rolled sheet annealing was performed under conditions of 700° C. for 12 hours.

In addition, regarding some of the steel sheets (B41 to B43), after cold rolling, the steel sheets were heated to 760° C. to be annealed, and, furthermore, immersed in an Al plating bath containing 10% of Si and 2% of Fe with a remainder of an impurity at 680° to produce Al-plated steel sheets.

In addition, some of the steel sheets (B44 to B46) were cold-rolled and then immersed in a molten zinc bath at 470° C. to produce galvanized steel sheets.

As a result of measuring the chemical compositions at the ¼ positions of the sheet thicknesses from the surfaces in the sheet thickness direction of these steel sheets (hot-rolled steel sheets, cold-rolled steel sheets, and coated steel sheets), the chemical compositions were the same as the chemical compositions of the slabs.

TABLE 1-1

| | Steel No. | Chemical composition (mass %), remainder: Fe and impurity | | | | | | | | | | | | |
|---|---|---|---|---|---|---|---|---|---|---|---|---|---|---|
| | | C | Si | Mn | P | S | N | O | Cr | Cu | Ti | B | Mo | Ni |
| Invention Example | A1 | 0.26 | 0.61 | 0.90 | 0.018 | 0.0030 | 0.006 | 0.005 | 0.40 | 0.35 | | | | |
| | A2 | 0.56 | 0.32 | 0.38 | 0.002 | 0.0003 | 0.003 | 0.003 | 0.15 | 0.32 | 0.027 | 0.0023 | | |
| | A3 | 0.30 | 0.15 | 0.78 | 0.008 | 0.0006 | 0.004 | 0.004 | 0.18 | 0.26 | 0.032 | 0.0022 | 0.11 | |
| | A4 | 0.33 | 1.50 | 0.76 | 0.007 | 0.0004 | 0.003 | 0.003 | 0.14 | 0.30 | 0.026 | 0.0026 | | 0.10 |
| | A5 | 0.40 | 0.30 | 0.36 | 0.010 | 0.0012 | 0.006 | 0.005 | 0.34 | 0.18 | | 0.0030 | | 0.20 |
| | A6 | 0.27 | 0.50 | 2.00 | 0.002 | 0.0002 | 0.003 | 0.003 | 0.14 | 0.25 | 0.026 | 0.0026 | | |
| | A7 | 0.29 | 0.30 | 0.55 | 0.041 | 0.0004 | 0.004 | 0.004 | 0.14 | 0.27 | 0.030 | 0.0023 | 0.17 | |
| | A8 | 0.29 | 0.32 | 0.60 | 0.009 | 0.0080 | 0.003 | 0.003 | 0.15 | 0.32 | 0.028 | 0.0023 | | |
| | A9 | 0.30 | 0.45 | 0.72 | 0.013 | 0.0011 | 0.008 | 0.008 | 0.13 | 0.33 | 0.030 | 0.0027 | | |
| | A10 | 0.29 | 0.45 | 0.77 | 0.013 | 0.0011 | 0.003 | 0.008 | 0.16 | 0.35 | 0.025 | 0.0027 | | |
| | A11 | 0.36 | 0.44 | 0.65 | 0.010 | 0.0004 | 0.003 | 0.004 | 0.08 | 0.35 | 0.022 | 0.0020 | | |
| | A12 | 0.30 | 0.47 | 0.72 | 0.006 | 0.0003 | 0.004 | 0.003 | 0.70 | 0.28 | 0.020 | 0.0030 | 0.10 | |
| | A13 | 0.33 | 0.42 | 1.04 | 0.008 | 0.0018 | 0.005 | 0.005 | 0.17 | 0.12 | 0.036 | 0.0023 | | 0.10 |
| | A14 | 0.37 | 0.31 | 0.45 | 0.009 | 0.0012 | 0.006 | 0.006 | 0.15 | 0.80 | 0.040 | 0.0023 | | |
| | A15 | 0.29 | 0.25 | 1.23 | 0.008 | 0.0004 | 0.003 | 0.003 | 0.41 | 0.22 | 0.028 | 0.0021 | | 0.01 |
| | A16 | 0.34 | 0.41 | 0.65 | 0.009 | 0.0006 | 0.004 | 0.004 | 0.12 | 0.26 | 0.036 | 0.0024 | 0.20 | 0.10 |
| | A17 | 0.47 | 0.50 | 0.43 | 0.005 | 0.0004 | 0.003 | 0.003 | 0.20 | 0.32 | 0.034 | 0.0022 | 0.18 | 0.15 |
| Comparative Example | a1 | 0.18 | 0.15 | 1.15 | 0.011 | 0.0012 | 0.003 | 0.005 | 0.18 | 0.20 | | 0.0024 | | |
| | a2 | 0.75 | 0.38 | 1.05 | 0.009 | 0.0013 | 0.004 | 0.004 | 0.15 | 0.40 | 0.035 | | | |
| | a3 | 0.46 | 0.01 | 1.33 | 0.012 | 0.0015 | 0.005 | 0.005 | 0.34 | 0.18 | | | | 0.25 |
| | a4 | 0.30 | 2.55 | 0.78 | 0.015 | 0.0023 | 0.004 | 0.005 | 0.55 | 0.25 | | | | |
| | a5 | 0.33 | 0.25 | 0.05 | 0.013 | 0.0018 | 0.005 | 0.005 | 0.14 | 0.14 | | | | |
| | a6 | 0.42 | 0.60 | 3.50 | 0.016 | 0.0018 | 0.005 | 0.005 | 0.20 | 0.24 | 0.037 | 0.0022 | | |
| | a7 | 0.36 | 0.25 | 1.02 | 0.120 | 0.0014 | 0.004 | 0.004 | 0.32 | 0.34 | | | | 0.29 |
| | a8 | 0.38 | 0.63 | 1.10 | 0.018 | 0.0800 | 0.005 | 0.005 | 0.28 | 0.44 | 0.032 | | | |
| | a9 | 0.42 | 0.55 | 1.24 | 0.013 | 0.0018 | 0.110 | 0.004 | 0.17 | 0.31 | | | 0.38 | |
| | 10 | 0.40 | 0.66 | 1.32 | 0.011 | 0.0010 | 0.005 | 0.130 | 0.22 | 0.31 | | | | |
| | a11 | 0.52 | 1.01 | 1.32 | 0.022 | 0.0015 | 0.004 | 0.004 | 0.01 | 0.22 | | | | |
| | a12 | 0.45 | 0.27 | 1.00 | 0.015 | 0.0008 | 0.004 | 0.004 | 1.80 | 0.37 | | | | |
| | a13 | 0.48 | 0.26 | 1.16 | 0.011 | 0.0007 | 0.005 | 0.004 | 0.17 | 0.01 | | | | 0.45 |

TABLE 1-2

| Steel No. | Chemical composition (mass %), remainder: Fe and impurity | | | | | | | | | | | Transformation point (° C.) | | Upper critical cooling rate (° C./s) |
|---|---|---|---|---|---|---|---|---|---|---|---|---|---|---|
| | Nb | V | Ca | Mg | Al | Sn | W | Sb | Zr | Co | REM | Ac3 | Ms | |
| A1 | | | | | | | | | | | | 822 | 398 | 30 |
| A2 | 0.03 | | | | | | | | | | 0.06 | 770 | 300 | 10 |
| A3 | 0.05 | | | | | | | | | | | 805 | 394 | 30 |
| A4 | 0.04 | | | | | | | | | | | 874 | 369 | 20 |
| A5 | | 0.05 | | | | | | | | | | 788 | 366 | 40 |
| A6 | 0.04 | | 0.002 | 0.002 | | | | | | | | 789 | 359 | 30 |
| A7 | | | | | | | | | | | 0.12 | 839 | 407 | 30 |
| A8 | 0.04 | | | | 0.03 | | | | | | | 816 | 402 | 30 |
| A9 | | 0.003 | | | | | 0.23 | | 0.12 | | | 820 | 394 | 30 |
| A10 | | | | | | | | | | 0.12 | | 812 | 399 | 30 |
| A11 | | | | | | | | 0.11 | | | | 802 | 375 | 30 |
| A12 | 0.04 | | | | | 0.05 | | | | | | 806 | 384 | 30 |
| A13 | | | | | | | | 0.04 | | | | 804 | 372 | 20 |
| A14 | | | | 0.002 | | | | | | | | 792 | 362 | 10 |
| A15 | 0.05 | | | | 0.03 | 0.01 | | | | | | 788 | 373 | 20 |
| A16 | 0.04 | | | | 0.04 | | | | | | | 821 | 379 | 20 |
| A17 | 0.02 | | | | 0.02 | 0.01 | | | | | 0.05 | 804 | 332 | 20 |
| a1 | | | | | | | | | | | | 799 | 435 | 30 |
| a2 | | | | | | | | | | | | 735 | 192 | 10 |
| a3 | | | | | 0.08 | | | | | | | 735 | 299 | 20 |
| a4 | | | | 0.10 | | | 0.30 | 0.15 | | | | 956 | 349 | 20 |
| a5 | | | | | | | | | 0.30 | 0.30 | | 806 | 412 | 80 |
| a6 | | | | | | | 0.18 | | | | | 748 | 237 | 10 |
| a7 | | 0.27 | | | | | | | | | | 871 | 353 | 30 |
| a8 | | | | | | | | | 0.32 | | | 804 | 342 | 30 |
| a9 | 0.02 | | | | | | | | | | 0.12 | 788 | 319 | 20 |
| a10 | | | 0.006 | 0.005 | | | | | | | | 785 | 331 | 20 |
| a11 | | | | | | | | | | | | 804 | 282 | 10 |
| a12 | | | | | | | 0.12 | 0.12 | | | | 744 | 288 | 20 |
| a13 | | 0.21 | | | | | | | | | | 770 | 300 | 20 |

Steel sheets of 200 mm×50 mm (×sheet thickness) and 68 mm×8 mm (×sheet thickness) were cut out from the obtained steel sheets, and heat treatments in which these steel sheets were heated up to heating temperatures shown in Table 2-1 and Table 2-2 at average temperature rising rate shown in Tables 2-1 and 2-2, held within ranges of these heating temperatures±10° C. for 60 seconds and cooled to temperatures of the Ms point or lower at average cooling rates shown in Table 2-1 and Table 2-2 were performed, thereby obtaining steels B1 to B46 and b1 to b50.

The chemical compositions at the ¼ positions of the sheet thicknesses from the surfaces in the sheet thickness direction of steel sheet substrates of the 200 mm×50 mm steels that had been subjected to the above-described heat treatments were the same as the chemical compositions of the slabs.

In addition, the martensite area ratios of the internal structures of the 200 mm×50 mm steels that had been subjected to the above-described heat treatment were obtained by the above-described procedure. The results are shown in Table 2-3 and Table 2-4. The remainders of the internal structures were one or more of residual austenite, bainite, ferrite, and pearlite.

On the 200 mm×50 mm steels and 68 mm×8 mm steels that had been subjected to the above-described heat treatment, the protective film stabilizing treatment was performed at room temperature under conditions of salt concentrations, wet ratios, and the number of cycles (8 hours per cycle) shown in Tables 2-1 and 2-2, and steels having the protective film were obtained.

However, in the examples where the Al—Fe-based coat or the Zn—Fe-based coat was formed on the surface, the protective film stabilizing treatment was performed on the surfaces exposed by cutting (on which the Al—Fe-based coat or the Zn—Fe-based coat was not formed).

On the obtained steels, X-ray diffraction, tensile tests, and exposure tests were performed by the following methods, and the peak intensities at a diffraction angle position of 35.5±0.5° in a case where the peak intensity of the protective film at a diffraction angle position of 36.6±0.5° was set to 100% (relative intensity of peak intensity in the tables), the tensile strengths, and the hydrogen embrittlement resistance in a corrosive environment were evaluated. The evaluation results are shown in Table 2-3 and Table 2-4.

<X-Ray Diffraction>

For the protective films of the steels, the peak intensities at a diffraction angle (2θ) position of 35.5±0.5° and the peak intensities at a diffraction angle position of 36.6±0.5° were obtained using a CuKα radiation under a condition of 2°/min, and the peak intensities at the 35.5±0.5° position in a case where the peak intensity at the 36.6±0.5° position was set to 100% (relative intensities) were obtained. In the calculation of the peak intensities, diffraction profiles were fitted using a pseudo-Voigt function, the peak counts were obtained, B-spline interpolation was performed as a background, and the values were subtracted to obtain the peak intensities. For the X-ray diffraction measurement, a Smart-Lab 3 kW manufactured by Rigaku Corporation was used, and the profiles were fitted using a SmartLab Studio II manufactured by Rigaku Corporation.

<Tensile Strength>

The tensile test was performed in accordance with ASTM Standard E8. The 200 mm×50 mm steel that had been subjected to the heat treatment and the protective film stabilizing treatment was ground up to a thickness of 1.2 mm, and then a half-sized sheet-shaped test piece of ASTM standard E8 (parallel portion length: 32 mm, parallel portion sheet width: 6.25 mm) was collected such that a test direction was parallel to a rolling direction. In addition, a strain gauge (gauge length: 5 mm) was attached to the center of the parallel portion of the test piece in the width and length directions, a room temperature tensile test was performed at a strain rate of 3 mm/min, and the tensile strength (maximum strength) was measured. In the present example, a case where the tensile strength was more than 1,500 MPa was evaluated as having excellent strength.

<Exposure Test>

The hydrogen embrittlement resistance in a corrosive environment was evaluated by an exposure test of the steel imparted with stress. Specifically, a four-point bent test body in which strain equivalent to ½ of a tensile strength obtained in advance by a method to be described below was imparted to the 68 mm×8 mm steel that had been subjected to the heat treatment and the protective film stabilizing treatment, was produced. Prior to the production of this test body, a test piece manufactured in advance at the same chance was prepared, the same strain gauge (gauge length: 5 mm) as in the tensile test was attached to the center of the test piece in the width and length directions, the relationship between strain and the four-point bending displacement amount was obtained, and a four-point bending displacement amount that became the strain equivalent to ½ of the tensile strength was obtained. The test body bent at four points was subjected to an outdoor exposure test (1-1, Tobihatacho, Tobata-ku, Kitakyushu-shi) together with a jig, and, in a case where no cracks were visually observed after one year or longer, the hydrogen embrittlement resistance in a corrosive environment was regarded as excellent.

TABLE 2-1

| | | | Heat treatment | | | Protective film stabilizing treatment | | |
| --- | --- | --- | --- | --- | --- | --- | --- | --- |
| Reference symbol | Steel No. | Steel sheet Sheet thickness (mm) | Temperature rising rate (° C./s) | Heating temperature (C) | Average cooling rate. (C/s) | Salt concentration (%) | Wet rate (%) | Number of cycles (Times) |
| Invention Example | B1 | A1 | 1.6 | 5 | 910 | 50 | 5 | 50 | 60 |
| | B2 | A2 | 1.6 | 5 | 910 | 50 | 5 | 50 | 60 |
| | B3 | A3 | 1.6 | 5 | 910 | 50 | 5 | 50 | 60 |
| | B4 | A4 | 1.6 | 5 | 910 | 50 | 5 | 50 | 60 |
| | B5 | A5 | 1.6 | 5 | 910 | 50 | 5 | 50 | 60 |
| | B6 | A6 | 1.6 | 5 | 910 | 50 | 5 | 50 | 60 |
| | B7 | A7 | 1.6 | 5 | 910 | 50 | 5 | 50 | 60 |
| | B8 | A8 | 1.6 | 15 | 910 | 50 | 5 | 50 | 60 |
| | B9 | A9 | 1.6 | 15 | 910 | 50 | 5 | 50 | 60 |
| | B10 | A10 | 1.6 | 15 | 910 | 50 | 5 | 50 | 60 |
| | B11 | A11 | 1.6 | 15 | 910 | 50 | 5 | 50 | 60 |
| | B12 | A12 | 1.6 | 15 | 910 | 50 | 5 | 50 | 60 |
| | B13 | A13 | 1.6 | 15 | 910 | 50 | 5 | 50 | 60 |
| | B14 | A14 | 1.6 | 15 | 910 | 50 | 5 | 50 | 60 |
| | B15 | A15 | 1.6 | 7 | 920 | 60 | 5 | 50 | 60 |
| | B16 | A15 | 1.6 | 7 | 920 | 60 | 3 | 50 | 60 |
| | B12 | A15 | 1.6 | 7 | 920 | 60 | 8 | 50 | 60 |
| | B18 | A15 | 1.6 | 7 | 920 | 60 | 5 | 40 | 60 |
| | B19 | A15 | 1.6 | 7 | 920 | 60 | 5 | 60 | 60 |
| | B20 | A15 | 1.6 | 7 | 920 | 60 | 5 | 50 | 40 |
| | B22 | A16 | 1.6 | 7 | 920 | 60 | 5 | 50 | 60 |
| | B23 | A16 | 1.6 | 7 | 920 | 60 | 3 | 50 | 60 |
| | B24 | A16 | 1.6 | 7 | 920 | 60 | 8 | 50 | 60 |
| | B25 | A16 | 1.6 | 7 | 920 | 60 | 5 | 40 | 60 |
| | B26 | A16 | 1.6 | 7 | 920 | 60 | 5 | 60 | 60 |
| | B27 | A16 | 1.6 | 7 | 920 | 60 | 5 | 50 | 40 |
| | B29 | A17 | 1.6 | 7 | 920 | 60 | 5 | 50 | 60 |
| | B30 | A17 | 1.6 | 7 | 920 | 60 | 3 | 50 | 60 |
| | B31 | A17 | 1.6 | 7 | 920 | 60 | 8 | 50 | 60 |
| | B32 | A17 | 1.6 | 7 | 920 | 60 | 5 | 40 | 60 |
| | B33 | A17 | 1.6 | 7 | 920 | 60 | 5 | 60 | 60 |
| | B34 | A17 | 1.6 | 7 | 920 | 60 | 5 | 50 | 40 |
| | B35 | A15 | 3.2 | 7 | 920 | 60 | 5 | 50 | 60 |
| | B36 | A16 | 3.2 | 7 | 920 | 60 | 3 | 50 | 60 |
| | B37 | A17 | 3.2 | 7 | 920 | 60 | 5 | 50 | 60 |
| | B38 | A15 | 1.6 | 7 | 920 | 60 | 5 | 50 | 60 |
| | B39 | A16 | 1.6 | 7 | 920 | 60 | 3 | 50 | 60 |
| | B40 | A17 | 1.6 | 7 | 920 | 60 | 5 | 50 | 60 |
| | B41 | A15 | 1.6 | 7 | 920 | 60 | 5 | 50 | 60 |
| | B42 | A16 | 1.6 | 7 | 920 | 60 | 3 | 50 | 60 |
| | B43 | A17 | 1.6 | 7 | 920 | 60 | 5 | 50 | 60 |
| | B44 | A15 | 1.6 | 7 | 920 | 60 | 5 | 50 | 60 |
| | B45 | A16 | 1.6 | 7 | 920 | 60 | 5 | 50 | 60 |
| | B46 | A17 | 1.6 | 7 | 920 | 60 | 5 | 50 | 60 |

TABLE 2-2

| | Reference symbol | Steel No. | Steel sheet Sheet thickness (mm) | Heat treatment Temperature rising rate (° C./s) | Heating temperature | Average cooling rate (° C./s) | Protective film stabilizing treatment Salt concentration | Wet rate | Number of cycles (Times) |
|---|---|---|---|---|---|---|---|---|---|
| Comparative Example | b1 | a1 | 1.6 | 5 | 910 | 50 | 5 | 50 | 60 |
| | b2 | a2 | 1.6 | 5 | 910 | 50 | 5 | 50 | 60 |
| | b3 | a3 | 1.6 | 5 | 910 | 50 | 5 | 50 | 60 |
| | b2 | a4 | 1.6 | 5 | 910 | 50 | 5 | 50 | 60 |
| | b5 | a5 | 1.6 | 5 | 910 | 50 | 5 | 50 | 60 |
| | b6 | a6 | 1.6 | 5 | 910 | 50 | 5 | 50 | 60 |
| | b7 | a7 | 1.6 | 5 | 910 | 50 | 5 | 50 | 60 |
| | b8 | a8 | 1.6 | 5 | 910 | 50 | 5 | 50 | 60 |
| | b9 | a9 | 1.6 | 5 | 910 | 50 | 5 | 50 | 60 |
| | b10 | a10 | 1.6 | 5 | 910 | 50 | 5 | 50 | 60 |
| | b11 | a11 | 1.6 | 5 | 910 | 50 | 5 | 50 | 60 |
| | b12 | a12 | 1.6 | 5 | 910 | 50 | 5 | 50 | 60 |
| | b13 | a13 | 1.6 | 5 | 910 | 50 | 5 | 50 | 60 |
| | b14 | A2 | 1.6 | 7 | 920 | 60 | 0 | 50 | 60 |
| | b15 | A2 | 1.6 | 7 | 920 | 60 | 15 | 50 | 60 |
| | b16 | A2 | 1.6 | 7 | 920 | 60 | 30 | 50 | 60 |
| | b17 | A2 | 1.6 | 7 | 920 | 60 | 5 | 1 | 60 |
| | b18 | A2 | 1.6 | 7 | 920 | 60 | 5 | 95 | 60 |
| | b19 | A2 | 1.6 | 7 | 920 | 60 | 5 | 50 | 9 |
| | b20 | A6 | 1.6 | 7 | 920 | 60 | 0 | 50 | 60 |
| | b21 | A6 | 1.6 | 7 | 920 | 60 | 15 | 50 | 60 |
| | b22 | A6 | 1.6 | 7 | 920 | 60 | 30 | 50 | 60 |
| | b23 | A6 | 1.6 | 7 | 920 | 60 | 5 | 1 | 60 |
| | b24 | A6 | 1.6 | 7 | 920 | 60 | 5 | 95 | 60 |
| | b25 | A6 | 1.6 | 7 | 920 | 60 | 5 | 50 | 9 |
| | b26 | A7 | 1.6 | 7 | 920 | 60 | 0 | 50 | 60 |
| | b27 | A7 | 1.6 | 7 | 920 | 60 | 15 | 50 | 60 |
| | b28 | A7 | 1.6 | 7 | 920 | 60 | 30 | 50 | 60 |
| | b29 | A7 | 1.6 | 7 | 920 | 60 | 5 | 1 | 60 |
| | b30 | A7 | 1.6 | 7 | 920 | 60 | 5 | 95 | 60 |
| | b31 | A7 | 1.6 | 7 | 920 | 60 | 5 | 50 | 9 |
| | b32 | A8 | 1.6 | 7 | 920 | 60 | 0 | 50 | 60 |
| | b33 | A8 | 1.6 | 7 | 920 | 60 | 15 | 50 | 60 |
| | b34 | A8 | 1.6 | 7 | 920 | 60 | 30 | 50 | 60 |
| | b35 | A8 | 1.6 | 7 | 920 | 60 | 5 | 1 | 60 |
| | b36 | A8 | 1.6 | 7 | 920 | 60 | 5 | 95 | 60 |
| | b37 | A8 | 1.6 | 7 | 920 | 60 | 5 | 50 | 9 |
| | b38 | A9 | 1.6 | 7 | 920 | 60 | 0 | 50 | 60 |
| | b39 | A9 | 1.6 | 7 | 920 | 60 | 15 | 50 | 60 |
| | b40 | A9 | 1.6 | 7 | 920 | 60 | 30 | 50 | 60 |
| | b41 | A9 | 1.6 | 7 | 920 | 60 | 5 | 1 | 60 |
| | b42 | A9 | 1.6 | 7 | 920 | 60 | 5 | 95 | 60 |
| | b43 | A9 | 1.6 | 7 | 920 | 60 | 5 | 50 | 9 |
| | b44 | A10 | 1.6 | 7 | 920 | 60 | 0 | 50 | 60 |
| | b45 | A10 | 1.6 | 7 | 920 | 60 | 15 | 50 | 60 |
| | b46 | A10 | 1.6 | 7 | 920 | 60 | 30 | 50 | 60 |
| | b47 | A10 | 1.6 | 7 | 920 | 60 | 5 | 1 | 60 |
| | b48 | A10 | 1.6 | 7 | 920 | 60 | 5 | 95 | 60 |
| | b49 | A10 | 1.6 | 7 | 920 | 60 | 5 | 50 | 9 |
| | b50 | A11 | 1.6 | 7 | 920 | 60 | 5 | 50 | 120 |

TABLE 2-3

| | Reference. symbol | Steel No. | Steel Martensite area ratio (%) | Relative intensity of peak intensity (%) | Tensile strength (MPa) | Maximum Cu content of protective film (mass %) | Cu concentration ratio | Hydrogen embrittlement resistance (exposure test) O: Not cracked X: Cracked |
|---|---|---|---|---|---|---|---|---|
| Invention Example | B1 | A1 | 100 | 312 | 1771 | 0.95 | 2.7 | O |
| | B2 | A2 | 94 | 324 | 2731 | 0.83 | 2.6 | O |
| | B3 | A3 | 98 | 293 | 1918 | 0.57 | 2.2 | O |
| | B4 | A4 | 92 | 328 | 2073 | 0.75 | 2.5 | O |
| | B5 | A5 | 97 | 336 | 2308 | 0.32 | 1.8 | O |
| | B6 | A6 | 96 | 321 | 1925 | 0.55 | 2.2 | O |
| | B7 | A7 | 98 | 316 | 1812 | 0.62 | 2.3 | O |
| | B8 | A8 | 97 | 328 | 1817 | 0.83 | 2.6 | O |
| | B9 | A9 | 100 | 325 | 1871 | 0.86 | 2.6 | O |

TABLE 2-3-continued

| Reference. symbol | Steel No. | Martensite area ratio (%) | Relative intensity of peak intensity (%) | Tensile strength (MPa) | Maximum Cu content of protective film (mass %) | Cu concentration ratio | Hydrogen embrittlement resistance (exposure test) O: Not cracked X: Cracked |
|---|---|---|---|---|---|---|---|
| B10 | A10 | 99 | 330 | 1839 | 0.95 | 2.7 | O |
| B11 | A11 | 100 | 290 | 2166 | 0.91 | 2.6 | O |
| B12 | A12 | 96 | 386 | 1915 | 0.67 | 2.4 | O |
| B13 | A13 | 98 | 282 | 2083 | 0.19 | 1.6 | O |
| B14 | A14 | 97 | 401 | 2187 | 3.52 | 4.4 | O |
| B15 | A15 | 98 | 338 | 1925 | 0.48 | 2.2 | O |
| B16 | A15 | 98 | 322 | 1925 | 0.48 | 2.2 | O |
| B17 | A15 | 98 | 327 | 1928 | 0.48 | 2.2 | O |
| B18 | A15 | 98 | 304 | 1927 | 0.46 | 2.1 | O |
| B19 | A15 | 98 | 310 | 1922 | 0.48 | 2.2 | O |
| B20 | A15 | 98 | 287 | 1923 | 0.46 | 2.1 | O |
| B22 | A16 | 98 | 352 | 2079 | 0.60 | 2.3 | O |
| B23 | A16 | 98 | 315 | 2078 | 0.60 | 2.3 | O |
| B24 | A16 | 98 | 328 | 2078 | 0.57 | 2.2 | O |
| B25 | A16 | 98 | 328 | 2070 | 0.60 | 2.3 | O |
| B26 | A16 | 98 | 334 | 2079 | 0.57 | 2.2 | O |
| B27 | A16 | 98 | 292 | 2073 | 0.57 | 2.2 | O |
| B29 | A17 | 96 | 367 | 2617 | 0.83 | 2.6 | O |
| B30 | A17 | 96 | 322 | 2619 | 0.83 | 2.6 | O |
| B31 | A17 | 96 | 336 | 2610 | 0.83 | 2.6 | O |
| B32 | A17 | 96 | 337 | 2612 | 0.80 | 2.5 | O |
| B33 | A17 | 96 | 342 | 2609 | 0.80 | 2.5 | O |
| B34 | A17 | 96 | 306 | 2617 | 0.80 | 2.5 | O |
| B35 | A15 | 98 | 340 | 1902 | 0.48 | 2.2 | O |
| B36 | A16 | 98 | 354 | 2045 | 0.57 | 2.2 | O |
| B37 | A17 | 96 | 368 | 2567 | 0.80 | 2.5 | O |
| B38 | A15 | 98 | 335 | 1918 | 0.46 | 2.1 | O |
| B39 | A16 | 98 | 345 | 2033 | 0.57 | 2.2 | O |
| B40 | A17 | 96 | 369 | 2600 | 0.83 | 2.6 | O |
| B41 | A15 | 98 | 338 | 1924 | 0.51 | 2.3 | O |
| B42 | A16 | 98 | 353 | 2080 | 0.62 | 2.4 | O |
| B43 | A17 | 96 | 365 | 2617 | 0.86 | 2.7 | O |
| B44 | A15 | 98 | 335 | 1920 | 0.48 | 2.2 | O |
| B45 | A16 | 98 | 347 | 2048 | 0.60 | 2.3 | O |
| B46 | A17 | 96 | 365 | 2580 | 0.83 | 2.6 | O |

TABLE 2-4

| | Reference symbol | Steel No. | Martensite area ratio (%) | Relative intensity of peak intensity (%) | Tensile strength (MPa) | Maximum Cu content of protective film (mass %) | Cu concentration ratio | Hydrogen embrittlement resistance (exposure test) O: Not cracked X: Cracked |
|---|---|---|---|---|---|---|---|---|
| Comparative Example | b1 | a1 | 100 | 372 | 1440 | 0.42 | 2.1 | O |
| | b2 | a2 | 87 | 340 | 2934 | 1.12 | 2.8 | X |
| | b3 | a3 | 96 | 209 | 2660 | 0.31 | 1.7 | X |
| | b2 | a4 | 51 | 454 | 1365 | 0.55 | 2.2 | O |
| | b5 | a5 | 40 | 300 | 1230 | 0.22 | 1.6 | O |
| | b6 | a6 | 91 | 302 | 2728 | 0.53 | 2.2 | X |
| | b7 | a7 | 98 | 340 | 2198 | 0.88 | 2.6 | X |
| | b8 | a8 | 97 | 320 | 2304 | 1.23 | 2.8 | X |
| | b9 | a9 | 98 | 345 | 2491 | 0.78 | 2.5 | X |
| | b10 | a10 | 97 | 315 | 2412 | 0.78 | 2.5 | X |
| | b11 | a11 | 96 | 202 | 2711 | 0.48 | 2.2 | X |
| | b12 | a12 | 93 | 433 | 2589 | 0.93 | 2.5 | X |
| | b13 | a13 | 95 | 175 | 2731 | 0.01 | 1.0 | X |
| | b14 | A2 | 94 | 112 | 2738 | 0.74 | 2.3 | X |
| | b15 | A2 | 94 | 204 | 2735 | 0.80 | 2.5 | X |
| | b16 | A2 | 94 | 153 | 2731 | 0.80 | 2.5 | X |
| | b17 | A2 | 94 | 131 | 2733 | 0.77 | 2.4 | X |
| | b18 | A2 | 94 | 129 | 2767 | 0.77 | 2.4 | X |
| | b19 | A2 | 94 | 83 | 2738 | 0.70 | 2.2 | X |
| | b20 | A6 | 96 | 105 | 1927 | 0.48 | 1.9 | X |
| | b21 | A6 | 96 | 205 | 1927 | 0.53 | 2.1 | X |

TABLE 2-4-continued

| Reference symbol | Steel No. | Martensite area ratio (%) | Relative intensity of peak intensity (%) | Tensile strength (MPa) | Maximum Cu content of protective film (mass %) | Cu concentration ratio | Hydrogen embrittlement resistance (exposure test) O: Not cracked X: Cracked |
|---|---|---|---|---|---|---|---|
| b22 | A6 | 96 | 146 | 1925 | 0.53 | 2.1 | X |
| b23 | A6 | 96 | 126 | 1918 | 0.53 | 2.1 | X |
| b24 | A6 | 96 | 120 | 1923 | 0.50 | 2.0 | X |
| b25 | A6 | 96 | 80 | 1927 | 0.45 | 1.8 | X |
| b26 | A7 | 98 | 108 | 1860 | 0.54 | 2.0 | X |
| b27 | A7 | 98 | 206 | 1859 | 0.59 | 2.2 | X |
| b28 | A7 | 98 | 148 | 1858 | 0.59 | 2.2 | X |
| b29 | A7 | 98 | 128 | 1855 | 0.57 | 2.1 | X |
| b30 | A7 | 98 | 119 | 1855 | 0.57 | 2.1 | X |
| b31 | A7 | 98 | 80 | 1851 | 0.51 | 1.9 | X |
| b32 | A8 | 97 | 113 | 1865 | 0.77 | 2.4 | X |
| b33 | A8 | 97 | 208 | 1865 | 0.80 | 2.5 | X |
| b34 | A8 | 97 | 155 | 1866 | 0.80 | 2.5 | X |
| b35 | A8 | 97 | 132 | 1859 | 0.77 | 2.4 | X |
| b36 | A8 | 97 | 129 | 1858 | 0.77 | 2.4 | X |
| b37 | A8 | 97 | 84 | 1863 | 0.70 | 2.2 | X |
| b38 | A9 | 100 | 118 | 1918 | 0.76 | 2.3 | X |
| b39 | A9 | 100 | 201 | 1916 | 0.83 | 2.5 | X |
| b40 | A9 | 100 | 155 | 1918 | 0.83 | 2.5 | X |
| b41 | A9 | 100 | 138 | 1913 | 0.79 | 2.4 | X |
| b42 | A9 | 100 | 130 | 1913 | 0.79 | 2.4 | X |
| b43 | A9 | 100 | 85 | 1911 | 0.73 | 2.2 | X |
| b44 | A10 | 99 | 112 | 1919 | 0.81 | 2.3 | X |
| b45 | A10 | 99 | 198 | 1920 | 0.88 | 2.5 | X |
| b46 | A10 | 99 | 151 | 1918 | 0.84 | 2.4 | X |
| b47 | A10 | 99 | 132 | 1914 | 0.84 | 2.4 | X |
| b48 | A10 | 99 | 129 | 1910 | 0.81 | 2.3 | X |
| b49 | A10 | 99 | 83 | 1915 | 0.74 | 2.1 | X |
| b50 | A11 | 100 | — | — | — | — | — |

As shown in Table 2-1 to Table 2-4, Invention Examples B1 to B46 that satisfied the scope of the present invention showed good results in terms of both structure and properties: however, in Comparative Examples b1 to b49 that did not satisfy the scope of the present invention, the chemical compositions or the formation of the protective film was insufficient, and at least one of strength and the hydrogen embrittlement resistance was poor. In addition, in Comparative Example b50, since the protective film exfoliated in the protective film stabilizing treatment, it was not possible to proceed to the evaluation of the next step.

BRIEF DESCRIPTION OF THE REFERENCE SYMBOLS

1: steel
11: steel sheet substrate
12: protective film
13: corrosion-resistant coat (coat)

What is claimed is:
1. A steel comprising:
a steel sheet substrate; and
a protective film formed on at least a part of a surface of the steel sheet substrate,
wherein a chemical composition of the steel sheet substrate is, by mass %,
C: 0.25% to 0.65%;
Si: 0.05% to 2.00%;
Mn: 0.30% to 3.00%;
P: 0.050% or less;
S: 0.0100% or less;
N: 0.010% or less;
O: 0.010% or less;
Cr: 0.05% to 1.00%;
Cu: 0.10% to 1.00%;
Ti: 0% to 0.10%;
B: 0% to 0.0100%;
Mo: 0% to 1.00%;
Ni: 0% to 1.00%;
Nb: 0% to 0.10%;
V: 0% to 1.00%;
Ca: 0% to 0.010%;
Mg: 0% to 0.010%;
Al: 0% to 1.00%;
Sn: 0% to 1.00%;
W: 0% to 1.00%;
Sb: 0% to 1.00%;
Zr: 0% to 1.00%;
Co: 0% to 1.00%;
REM: 0% to 0.30%; and
a remainder: Fe and an impurities,
in an X-ray analysis in which measurement is carried out using a CuKα radiation, in a case where a peak intensity at a diffraction angle (2θ) position of 36.6±0.5° is regarded as 100%, the protective film has a peak having a peak intensity of more than 250% at a diffraction angle (2θ) position of 35.5±0.5°,
a tensile strength is more than 1,500 MPa, and
a ratio of a maximum Cu content in the protective film to a Cu content in the steel sheet substrate is 1.5 or more.
2. The steel according to claim 1,
wherein the protective film is formed on the entire surface of the steel sheet substrate.

3. The steel according to claim 1,
wherein a corrosion-resistant coat is formed on a portion of the surface of the steel sheet substrate, on which the protective film is not formed.
4. The steel according to claim 3,
wherein the corrosion-resistant coat is formed on each of two surfaces of the steel sheet substrate perpendicular to a sheet thickness direction, and the protective film is formed on each of two surfaces of the steel sheet substrate parallel to the sheet thickness direction.
5. The steel according to claim 3,
wherein the corrosion-resistant coat is an Al—Fe-based coat or a Zn—Fe-based coat.

* * * * *